(12) United States Patent
Park et al.

(10) Patent No.: US 11,402,402 B2
(45) Date of Patent: Aug. 2, 2022

(54) SYSTEMS AND METHODS FOR HUMAN BODY MOTION CAPTURE

(71) Applicant: Bigmotion Technologies Inc., Surrey (CA)

(72) Inventors: Jung Wook Park, Surrey (CA); Shaghayegh Zihajehzadeh, Burnaby (CA)

(73) Assignee: BigMotion Technologies Inc., Surrey (CA)

( * ) Notice: Subject to any disclaimer, the term of this patent is extended or adjusted under 35 U.S.C. 154(b) by 173 days.

(21) Appl. No.: 16/069,860

(22) PCT Filed: Jan. 11, 2017

(86) PCT No.: PCT/CA2017/050029
§ 371 (c)(1),
(2) Date: Jul. 12, 2018

(87) PCT Pub. No.: WO2017/120669
PCT Pub. Date: Jul. 20, 2017

(65) Prior Publication Data
US 2019/0056422 A1 Feb. 21, 2019

Related U.S. Application Data

(60) Provisional application No. 62/277,842, filed on Jan. 12, 2016.

(51) Int. Cl.
*G01P 13/00* (2006.01)
*G01P 15/18* (2013.01)
(Continued)

(52) U.S. Cl.
CPC ............ *G01P 13/00* (2013.01); *A63F 13/212* (2014.09); *A63F 13/213* (2014.09); *A63F 13/60* (2014.09); *G01P 15/18* (2013.01)

(58) Field of Classification Search
CPC ........ G01P 13/00; G01P 15/18; A63F 13/212; A63F 13/213; A63F 13/60; G01C 21/16
(Continued)

(56) References Cited

U.S. PATENT DOCUMENTS 6,820,025 B2  11/2004  Bachmann et al.
2008/0262772 A1*  10/2008  Luinge ................. A61B 5/1114
702/94

(Continued)

FOREIGN PATENT DOCUMENTS

CA    2673795 A1    5/2010
CN    101692284 A   4/2010
EP    1970005 A1    9/2008

OTHER PUBLICATIONS

Corrales et al. "Hybrid tracking of human operators using IMU/UWB data fusion by a Kalman filter", Mar. 12-15, 2008, p. 1. (Year: 2008).*

(Continued)

*Primary Examiner* — Michael P Nghiem
(74) *Attorney, Agent, or Firm* — Norton Rose Fulbright Canada LLP; Maya Medeiros

(57) ABSTRACT

The present disclosure provides substantially magnetometer-free systems and methods for motion capture of a subject including 3-D localization and posture tracking by fusing inertial sensors with a localization system and a biomechanical model of the subject. Using the novel Kalman filter based fusion techniques disclosed herein, the localization data aided with the biomechanical model can eliminate the drift in inertial yaw angle estimation.

10 Claims, 12 Drawing Sheets

(51) Int. Cl.
A63F 13/212 (2014.01)
A63F 13/60 (2014.01)
A63F 13/213 (2014.01)

(58) Field of Classification Search
USPC .......................................................... 702/141
See application file for complete search history.

(56) References Cited

U.S. PATENT DOCUMENTS

| | | | |
|---|---|---|---|
| 2008/0285805 A1* | 11/2008 | Luinge | A61B 5/1122 382/107 |
| 2009/0204031 A1 | 8/2009 | McNames et al. | |
| 2014/0298906 A1 | 10/2014 | Tzidon et al. | |
| 2015/0032408 A1* | 1/2015 | Grenet | A61B 5/1116 702/141 |
| 2015/0375108 A1 | 12/2015 | Pathirana | |

OTHER PUBLICATIONS

English translation of CN104757976, Jul. 8, 2015. (Year: 2015).*
Yoon et al., "Robust Biomechanical Model-Based 3-D Indoor Localization and Tracking Method Using UWB and IMU", Feb. 15, 2017, IEEE Sensors Journal, vol. 17, pp. 1084-1096. (Year: 2017).*
Zihajehzadeh et al. "A Cascaded Two-Step Kalman Filter for Estimation of Human Body Segment Orientation Using MEMS-IMU", 2014, IEEE. (Year: 2014).*
Corrales, J.A. et al., "Hybrid Tracking of Human Operators using IMU/UWB Data Fusion by a Kalman Filter", HRI'08, Mar. 12-15, 2008, Amsterdam, Netherlands, p. 193-200.
Nilsson, J-O et al, "Signal Processing Issues in Indoor Positioning by Ultra Wide Band Radio Aided Inertial Navigation", 17th European Signal Processing Conference (EUSIPCO 2009), Glasgow, Scotland, Aug. 24-28, 2009, p. 2161-2165.
Kok, M. et al., "Indoor positioning using ultrawideband and inertial measurements", IEEE Transactions on Vehicular Technology, Apr. 2015, vol. 64, Issue 4, p. 1293-1303.
Zhajehzadeh, S. et al, "A Magnetometer-Free Indoor Human Localization Based on Loosely Coupled IMU/UWB Fusion", 2015 37th Annual International Conference of the IEEE Engineering in Medicine and Biology Society (EMBC), Aug. 25-29, 2015, p. 3141-3144.
Zihajehzadeh, S. et al., "UWB-Aided Inertial Motion Capture for Lower Body 3-D Dynamic Activity and Trajectory Tracking", IEEE Transactions on Instrumentation and Measurement, vol. 64, No. 12, Dec. 2015, p. 3577-2587.
International Search Report and Written Opinion dated Apr. 11, 2017, issued in connection with international application No. PCT/CA2017/050029.
X. Zhang and G. Fan; "Dual Gait Generative Models for Human Motion Estimation From a Single Camera"; IEEE Transactions On Systems, Man, And Cybernetics—Part B: Cybernetics, vol. 40, No. 4, Aug. 2010, pp. 1034-1049.
Gu et al.; "Action and Gait Recognition From Recovered 3-D Human Joints"; IEEE Transactions On Systems, Man, And Cybernetics—Part B: Cybernetics, vol. 40, No. 4, Aug. 2010, pp. 1021-1033.
Zihajehzadeh et al.; "Integration of MEMS Inertial and Pressure Sensors for Vertical Trajectory Determination"; IEEE Transactions On Instrumentation And Measurement, vol. 64, No. 3, Mar. 2015, pp. 804-814.
Zihajehzadeh et al.; "A Cascaded Two-Step Kalman Filter for Estimation of Human Body Segment Orientation Using MEMS-IMU"; 2014 36th Annual International Conference of the IEEE Engineering in Medicine and Biology Society, Chicago, IL, 2014, pp. 6270-6273.
Zihajehzadeh et al., "A cascaded Kalman filter-based GPS/MEMS-IMU integration for sports applications"; Measurement, vol. 73, Sep. 2015, pp. 200-210.
Favre et al., "Ambulatory measurement of 3D knee joint angle"; Journal of Biomechanics, vol. 41, 2008, pp. 1029-1035.

Roux et al.; "Evaluation of the global optimisation method within the upper limb kinematics analysis"; Journal of Biomechanics, vol. 35, 2002, pp. 1279-1283.
Meng et al. "Biomechanical model-based displacement estimation in micro-sensor motion capture"; Measurement Science and Technology, 23 (2012) 055101 (11pp).
Meng et al.; "Hierarchical Information Fusion for Global Displacement Estimation in Microsensor Motion Capture"; IEEE Transactions On Biomedical Engineering, vol. 60, No. 7, Jul. 2013, pp. 2052-2063.
Zhang et al.; "Adaptive Information Fusion for Human Upper Limb Movement Estimation"; IIEEE Transactions On Systems, Man, And Cybernetics—Part A: Systems And Humans, vol. 42, No. 5, Sep. 2012, pp. 1100-1108.
Pittet et al.; "UWB and MEMS Based Indoor Navigation"; The Journal of Navigation, vol. 61, No. 3, pp. 369-384, Jul. 2008.
E. Foxlin; "Pedestrian Tracking with Shoe-Mounted Inertial Sensors"; IEEE Computer Graphics and Applications, vol. 25, No. 6, pp. 38-46, Nov.-Dec. 2005.
Q. Yuan and I. M. Chen; "Human velocity and dynamic behavior tracking method for inertial capture system"; Sensors and Actuators A: Physical, vol. 83, 2012, pp. 123-131.
Fortes et al.; "Short-Range UWB Radar: Surveillance Robot Equipment of the Future"; 2014 IEEE International Conference on Systems, Man, and Cybernetics (SMC), San Diego, CA, 2014, pp. 3767-3772.
Zampella et al.; "Robust indoor positioning fusing PDR and RF technologies: the RFID and UWB case"; International Conference on Indoor Positioning and Indoor Navigation, Montbeliard-Belfort, 2013, pp. 1-10.
Hol et al.; "Tightly Coupled UWB/IMU Pose Estimation"; 2009 IEEE International Conference on Ultra-Wideband, 2009, pp. 688-692.
Zihajehzadeh et al.; "UWB-Aided Inertial Motion Capture for Lower Body 3-D Dynamic Activity and Trajectory Tracking"; IEEE Transactions On Instrumentation And Measurement, vol. 64, No. 12, Dec. 2015, pp. 3577-3587.
Zihajehzadeh et al; "A Magnetometer-Free Indoor Human Localization Based on Loosely Coupled IMU/UWB Fusion"; 2015 37th Annual International Conference of the IEEE Engineering in Medicine and Biology Society (EMBC), Milan, 2015, pp. 3141-3144.
J. K. Lee and E. J. Park; "Minimum-Order Kalman Filter With Vector Selector for Accurate Estimation of Human Body Orientation"; IEEE Transactions On Robotics, vol. 25, No. 5, Oct. 2009, pp. 1196-1201.
J. K. Lee and E. J. Park; "A Fast Quaternion-Based Orientation Optimizer via Virtual Rotation for Human Motion Tracking"; IEEE Transactions On Biomedical Engineering, vol. 56, No. 5, May 2009, pp. 1574-1582.
Riehle et al.; "Indoor Magnetic Navigation for the Blind"; 34th Annual International Conference of the IEEE Engineering in Medicine and Biology Society, 2012, pp. 1972-1975.
A. M. Sabatini; "Quaternion-Based Extended Kalman Filter for Determining Orientation by Inertial and Magnetic Sensing"; IEEE Transactions On Biomedical Engineering, vol. 53, No. 7, Jul. 2006, pp. 1346-1356.
M. El-Gohary and J. McNames; "Human Joint Angle Estimation with Inertial Sensors and Validation with A Robot Arm"; IEEE Transactions On Biomedical Engineering, vol. 62, No. 7, Jul. 2015, pp. 1759-1767.
Cooper et al.; "Inertial sensor-based knee flexion/extension angle estimation"; Journal of Biomechanics, vol. 42, 2009, pp. 2678-2685.
Luinge et al.; "Ambulatory measurement of arm orientation"; Journal of Biomechanics, vol. 40, 2007, pp. 78-85.
Tian et al.; "Upper limb motion tracking with the integration of IMU and Kinect"; Neurocomputing, vol. 159, 2015, pp. 207-218.
Lee et al.; "Estimation of Attitude and External Acceleration Using Inertial Sensor Measurement During Various Dynamic Conditions"; IEEE Transactions On Instrumentation And Measurement, vol. 61, No. 8, Aug. 2012, pp. 2262-2273.

(56) References Cited

OTHER PUBLICATIONS

Q. Li and J. T. Zhang; "Post-trial anatomical frame alignment procedure for comparison of 3D joint angle measurement from magnetic/inertial measurement units and camera-based systems"; Physiological Measurement, vol. 35, 2014, pp. 2255-2268.

Zhang et al.; "Concurrent validation of Xsens MVN measurement of lower limb joint angular kinematics"; Physiological Measurement, vol. 34, 2013, pp. N63-N69.

Waegli et al.; "Assessment of the Integration Strategy between GPS and Body-Worn MEMS Sensors with Application to Sports"; ION-GNSS 2007, Fort Worth (Texas, USA), Sep. 25-28, 2007.

Z. Q. Zhang and J. K. Wu; "A Novel Hierarchical Information Fusion Method for Three-Dimensional Upper Limb Motion Estimation," IEEE Transactions On Instrumentation And Measurement, vol. 60, No. 11, Nov. 2011, pp. 3709-3719.

Takeda et al.; "Gait posture estimation using wearable acceleration and gyro sensor"; Journal of Biomechanics, vol. 42, 2009, pp. 2486-2494.

Chen et al.; "Real-Time Human Motion Capture Driven by a Wireless Sensor Network"; International Journal of Computer Games Technology, vol. 2015, Article ID 695874, 14 pages, 2015.

Damian et al.; "Augmented Reality Using a 3D Motion Capturing Suit"; AH '13: Proceedings of the 4th Augmented Human International Conference, Mar. 2013, pp. 233-234.

A. Shingade and A. Ghotkar; "Animation of 3D Human Model Using Markerless Motion Capture Applied To Sports"; International Journal of Computer Graphics & Animation (IJCGA), vol. 4, No. 1, Jan. 2014, pp. 27-39.

G. Welch and E. Foxlin; "Motion Tracking:No Silver Bullet, but a Respectable Arsenal"; IEEE Computer Graphics and Applications, vol. 22, No. 6, pp. 24-38, Dec. 2002.

Q. Yuan and I. M. Chen; "3-D Localization of Human Based on an Inertial Capture System"; IEEE Transactions On Robotics, vol. 29, No. 3, Jun. 2013, pp. 806-812.

C. H. Wu and Y. C. Tseng; "Deploying Sensors for Gravity Measurement in a Body-Area Inertial Sensor Network"; IEEE Sensors Journal, vol. 13, No. 5, May 2013, pp. 1522-1533.

Corrales et al.; "Sensor data integration for indoor human tracking"; Robotics and Autonomous Systems, vol. 58, 2010, pp. 931-939.

Zhang et al.; "Monocular Camera and IMU Integration for Indoor Position Estimation"; 2014 36th Annual International Conference of the IEEE Engineering in Medicine and Biology Society, Chicago, IL, 2014, pp. 1198-1201.

Gu et al.; "A Survey of Indoor Positioning Systems for Wireless Personal Networks"; IEEE Communications Surveys & Tutorials, vol. 11, No. 1, First Quarter 2009, pp. 13-32.

Zampella et al.; "A Constraint Approach for UWB and PDR Fusion"; International Conference on Indoor Positioning and Indoor Navigation, Nov. 2012.

Tabatabaei et al.; "A Fast Calibration Method for Triaxial Magnetometers"; IEEE Transactions On Instrumentation And Measurement, vol. 62, No. 11, Nov. 2013, pp. 2929-2937.

Roetenberg et al.; "Compensation of Magnetic Disturbances Improves Inertial and Magnetic Sensing of Human Body Segment Orientation"; IEEE Transactions On Neural Systems And Rehabilitation Engineering, vol. 13, No. 3, Sep. 2005, pp. 395-405.

Seel et al.; "IMU-Based Joint Angle Measurement for Gait Analysis"; Sensors, 2014, vol. 14, pp. 6891-6909.

Skog et al.; "Zero-Velocity Detection—An Algorithm Evaluation," IEEE Transactions on Biomedical Engineering vol. 57, Issue 11, pp. 2657-2666, Nov. 2010.

\* cited by examiner

|  |  | Walking/stairs climbing | Jumping/jogging |
|---|---|---|---|
| Joint Angle RMSE (deg) | Ankle D-Flex/P-Flex | 1.4 ± 0.5 | 2.1 ± 0.9 |
| | Knee Flex/Ext | 3.5 ± 1.1 | 4.5 ± 1.3 |
| | Hip Flex/Ext | 2.7 ± 1.7 | 3.4 ± 2.1 |
| | Hip Abd/Add | 2.9 ± 1.5 | 3.7 ± 1.8 |

SYSTEMS AND METHODS FOR HUMAN BODY MOTION CAPTURE

CROSS REFERENCE TO RELATED APPLICATION

This application claims the benefit of priority of U.S. Provisional Patent Application No. 62/277,842 filed on Jan. 12, 2016, which is hereby incorporated herein by reference in its entirety.

TECHNICAL FIELD

The present disclosure relates to capturing motion of the human body. Particular embodiments provide systems and methods for accurately capturing lower body motion without the use of magnetometers.

BACKGROUND

Available human body inertial motion capture (MoCap) systems are typically aided with magnetometers to remove the drift error in yaw angle estimation, which in turn limits their application in the presence of long-lasting magnetic disturbance in indoor environments. MoCap systems are used by different disciplines to capture and reconstruct movement and posture of the human body. With the advances in 3-D visualization technology, MoCap has found numerous applications in gaming and film making, augmented reality and sport science, along with its application in rehabilitation and medical sciences. Optical systems, in which the position of reflective markers on body surface is accurately tracked during activities, have been commonly used for human body MoCap. However, these systems are costly, confined to limited space and suffer from occlusion. Recently, with the advent of the MEMS (microelectromechanical systems) technology, miniature inertial measurement units (IMUs) consisting of tri-axial accelerometer and gyroscope have emerged as wearable MoCap devices for both localization and posture tracking.

Wearable IMUs have been extensively used for 3-D localization purposes using inertial navigation techniques. In many of the proposed inertial navigation methods, magnetometers have been used as aiding devices to provide stable heading (yaw) angle over time. However, localization based on magnetometer aided IMUs will still drift due to the integration of inconstant accelerometer errors over time. Although the use of zero-velocity-update (ZUPT) can reduce or eliminate the drift error for shoe-mounted IMUs, the accuracy of such algorithms degrades over time and under fast movements with unstable ground contact.

To improve the indoor localization performance while taking advantage of high sampling rate of IMU (>100 Hz), absolute localization technologies with relatively low sampling rates (<10 Hz) have been fused with IMU. Among these technologies, ultra-wideband (UWB) localization has become popular due to its excellent precision, reasonable cost and low power consumption. However, UWB localization suffers from outliers caused by the metallic materials, non-line of sight (NLOS) conditions and reflection which degrade the localization accuracy. The available IMU/UWB fusion techniques are divided into tightly-coupled and loosely-coupled based on whether the raw time of transmission data or the triangulated position data is used in IMU/UWB fusion. While the former can be advantageous under UWB outages for outliers detection, the latter offers simpler implementation and less computation, making them desirable in wearable MoCap. However, magnetometers are typically used in existing loosely-coupled UWB/IMU fusion systems to help the estimation of the horizontal position and velocity. Thus, the presence of any magnetic disturbances in indoor environment will affect the accuracy of such systems.

In addition to localization, the estimation of 3-D orientation for each body segment is required for 3-D posture tracking in a typical MoCap application. Although a 3-D orientation estimate can be obtained by integrating the angular velocities from the tri-axial gyroscope, this integration causes unbounded orientation drift due to the gyroscope's bias instability. To solve this problem, some researchers have fused a tri-axial accelerometer and a tri-axial magnetometer with a tri-axial gyroscope using fusion algorithms. In the fused system, the orientation drift can be removed by employing accelerometer and magnetometer as the vertical (the gravity) and horizontal (the Earth's magnetic field) references, respectively. However, in indoor environments, the Earth's magnetic field can be easily disturbed by the presence of ferromagnetic objects. Although a constant magnetic disturbance can be effectively identified and removed by proper magnetometer calibration, indoor magnetic disturbances can be from varying sources and change over time. To deal with these magnetic disturbances, model-based sensor fusion, threshold-based switching and vector selector approaches have been proposed in the literature. Although these approaches are effective for short periods of time (e.g., 5-10 s), they are drift-prone under varying disturbances and over longer periods of time.

As a result, the development of magnetometer-free techniques for human body inertial MoCap has been the focus of many recent studies. Some papers have proposed methods for fusing tri-axial accelerometer and gyroscope with the biomechanical constraints of the human body to estimate the 3-D knee joint angle, the knee flexion/extension angle and the elbow angle. However, when it comes to the absolute orientation estimation about the vertical axis (i.e. the yaw angle), these methods either fail to estimate it, or suffer from drift over time. Although the joint angle provides sufficient information for biomedical applications in which the joint functionality is of the main concern, this information is not sufficient for 3-D motion reconstruction in gaming and sport science applications where absolute 3-D orientation of each body segments is required. Thus, magnetometers are still generally considered essential aiding components in the available 3-D full body, upper-body and lower-body inertial MoCap systems.

SUMMARY

One aspect provides a system for capturing lower body motion of a subject. The system comprises an inertial measurement unit (IMU) mounted on each of a left foot, a right foot, a left shank, a right shank, a left thigh, a right thigh and a pelvis of the subject, each IMU unit comprising an accelerometer and a gyroscope and configured to output rate of turn signals and acceleration signals, a localization tag mounted on each of a left mid foot, a right mid foot and a waist of the subject, a localization sensor system configured to detect each localization tag and to output position signals for each localization tag, and, a processing system in communication with each IMU and with the localization sensor system to receive the rate of turn, acceleration, and position signals, and to derive velocity signals for each localization tag from the position signals. The processing system comprises a tilt Kalman filter configured to process the rate of turn and acceleration signals from each IMU to generate a pitch angle and a roll angle for each of the left foot, right foot, left shank, right shank, left thigh, right thigh and pelvis, a localization Kalman filter configured to process the rate of turn and acceleration signals, the position signals and the velocity signals for each localization tag, and the pitch angle and the roll angle for each of the left foot, right foot and pelvis from the tilt Kalman filter to generate a position vector for each of the left mid foot, right mid foot and waist and a rotation matrix for each of the left foot, right foot and pelvis, a yaw Kalman filter configured to process the pitch angle and the roll angle for each of the left shank, right shank, left thigh and right thigh from the tilt Kalman filter and the position vector for each of the left mid foot, right mid foot and waist and the rotation matrix for each of the left foot, right foot and pelvis from the localization Kalman filter to generate a yaw angle for each of the left shank, right shank, left thigh and right thigh, and a motion reconstruction block configured to reconstruct full three-dimensional motion of the subject's lower body based on the pitch angle and the roll angle for each of the left shank, right shank, left thigh and right thigh from the tilt Kalman filter, the position vector for each of the left mid foot, right mid foot and waist and the rotation matrix for each of the left foot, right foot and pelvis from the localization Kalman filter, and the yaw angle for each of the left shank, right shank, left thigh and right thigh from the yaw Kalman filter.

Another aspect provides a method for capturing motion of a subject. The method comprises mounting a plurality of inertial measurement units (IMUs) on the subject, each IMU mounted on one of a plurality of body segments of the subject, the plurality or body segments comprising one or more kinematic chains, each kinematic chain having a root segment and an end segment, each IMU configured to generate acceleration signals and rate of turn signals for a respective body segment, mounting a plurality of localization tags on the subject, with one localization tag mounted at a localization point on each root segment and each end segment of the plurality of body segments of the subject, detecting the localization tags to generate position signals and velocity signals for each of the localization tags, processing the acceleration signals and the rate of turns signals for the plurality of IMUs in a tilt Kalman filter to generate a pitch angle and a roll angle for each of the plurality of body segments, processing the rate of turn and acceleration signals from the IMUs mounted on the root and end segments of the plurality of body segments, the position signals and the velocity signals for each of the localization tags from the localization sensor system, and the pitch angle and the roll angle for each of the root and end segments of the plurality of body segments from the tilt Kalman filter in a localization Kalman filter to generate a position vector for each localization point and a rotation matrix for each of the root and end segments of the plurality of body segments, processing the pitch angle and the roll angle for each of the plurality of body segments other than the root and end segments from the tilt Kalman filter and the position vector for each localization point and the rotation matrix for each of the root and end segments of the plurality of body segments from the localization Kalman filter in a yaw Kalman filter to generate a yaw angle for each of the plurality of body segments other than the root and end segments, and reconstructing full three-dimensional motion of the plurality of body segments based on the pitch angle and the roll angle for each of the plurality of body segments other than the root and end segments from the tilt Kalman filter, the position vector for each localization point on each end segment and the rotation matrix for each end segment and each root segment from the localization Kalman filter, and the yaw angle for each of the plurality of body segments other than the root and end segments from the yaw Kalman filter.

Further aspects and details of example embodiments are set forth below.

DRAWINGS

The following figures set forth embodiments in which like reference numerals denote like parts. Embodiments are illustrated by way of example and not by way of limitation in the accompanying figures.

DETAILED DESCRIPTION

Figure 1:
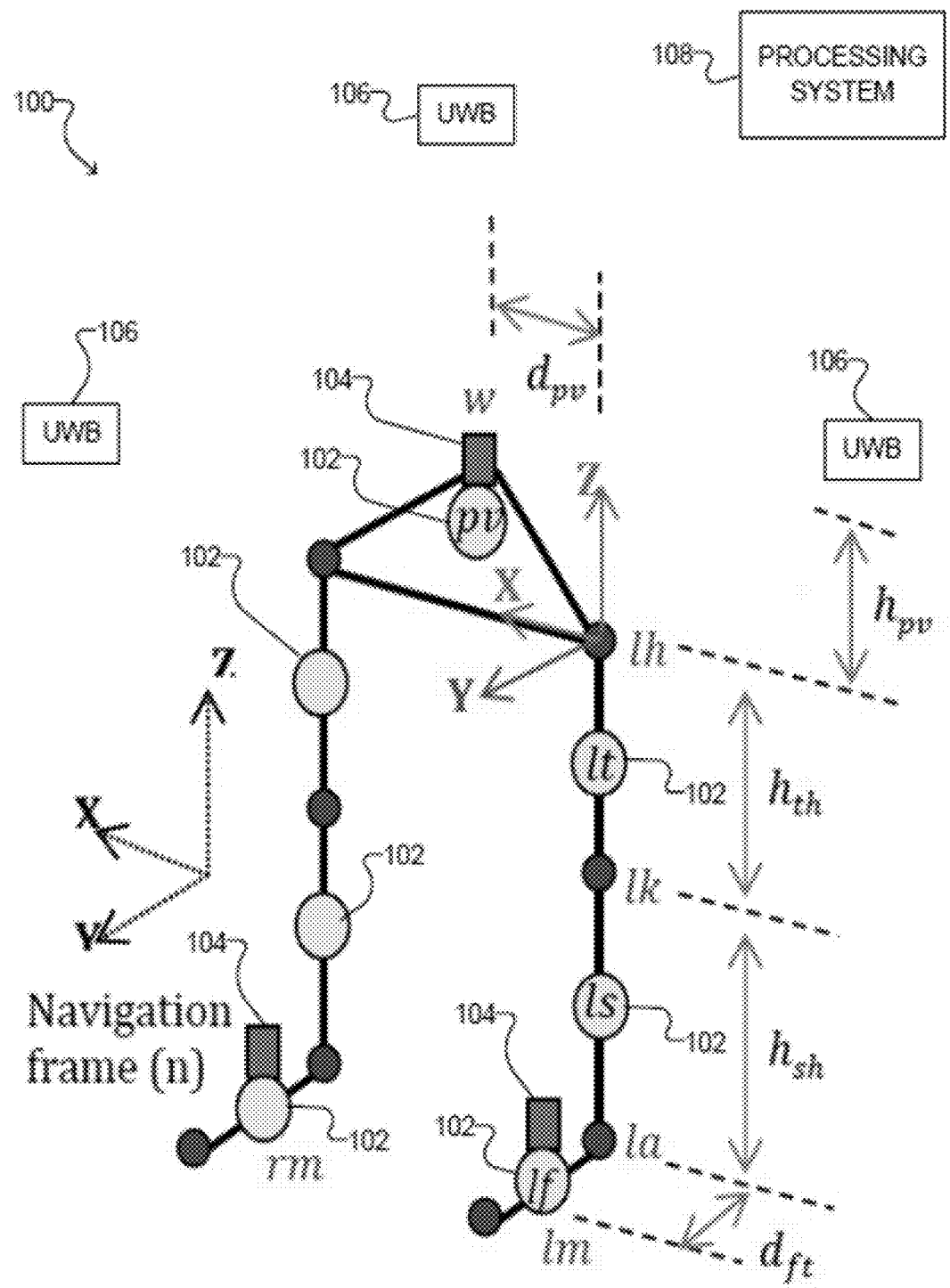
FIG. 1 shows an example motion capture system according to one embodiment.

The following describes substantially magnetometer-free systems and methods for lower-body MoCap including 3-D localization and posture tracking by fusing inertial sensors with an ultra-wideband (UWB) localization system and a biomechanical model of the human lower-body. Using the novel Kalman filter based fusion techniques disclosed herein, the UWB localization data aided with the biomechanical model can eliminate the drift in inertial yaw angle estimation of the lower-body segments. This magnetometer-free yaw angle estimation makes the proposed systems and methods insensitive to the magnetic disturbances. The proposed systems and methods are benchmarked against an optical MoCap system for various indoor activities including walking, jogging, jumping and stairs ascending/descending. The results show that the proposed systems and methods outperform the available magnetometer-aided techniques in yaw angle tracking under magnetic disturbances. In a uniform magnetic field, the proposed systems and methods show similar accuracies in localization and joint angle tracking compared to the magnetometer-aided methods. The localization accuracy of the proposed systems and methods is better than 4.5 cm in a 3-D space and the accuracy for knee angle tracking is about 3.5 and 4.5 degree in low and high dynamic motions, respectively.

In one embodiment, the present disclosure provides a magnetometer-free method for 3-D lower-body inertial MoCap including 3-D localization, posture tracking and motion reconstruction. The proposed method employs a UWB localization system in addition to IMUs attached to the lower-body segments. Also, the method makes the use of the fact that with the known inclination of the thigh and shank segments, the horizontal components of the hip-to-ankle vector depend on the orientation of the leg segments around the vertical axis. The method uses this fact to remove the drift in the yaw angle of the thigh and shank without using magnetometers. The proposed method has at least two novel aspects: 1) the UWB localization data is not only used for position tracking, but also aids in the estimation of yaw when fused with IMU in the novel magnetometer-free loosely-coupled localization filter discussed below; 2) by aiding the inertial data of some of the lower-body segments with position data (of the feet and waist) from the localization filter, a magnetometer-free 3-D lower-body posture tracking is developed. Although a UWB localization system is used in the examples described in the present disclosure; the proposed systems and methods can be generalized to work with any other absolute localization systems that have similar accuracies compared to the UWB technology (e.g., better than about 15 cm).

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Example Systems and Methods

In this section, the proposed method for magnetometer-free 3-D inertial MoCap aided with UWB localization system is described. FIG. 1 shows an example system 100 for capturing lower body motion according to an example embodiment. The system 100 comprises seven IMUs 102, three UWB tags 104, a UWB sensor system comprising a plurality of UWB sensors 106, and a processing system 108 in communication with the IMUs 102 and UWB sensors 106. Each IMU 102 comprises a tri-axial gyroscope and a tri-axial accelerometer, and generates rate of turn signals and acceleration signals which are provided to the processing system 108, preferably by means of a wireless communication protocol. The UWB sensors 106 detect the position of the UWB tags 104 and generate position signals for each UWB tag 104 which are provided to the processing system either wirelessly or by wired connections. The position signals from the UWB sensors 106 may be used by the processing to determine corresponding velocity signals in some embodiments. In other embodiments a localization sensor system may be configured to provide both position and velocity signals. The processing system 108 comprises inputs 290 for receiving signals from the IMUs 102 (e.g. accelerometer 204, gyroscope 202 of FIG. 2) and UWB sensors 106 (e.g. UWB 206 of FIG. 2), and one or more memory elements (e.g. memory 260) and one or more processing elements (e.g. processor 270) configured to store data and execute instructions 280 for processing the signals to determine the subject's motion, as described below.

As shown in FIG. 1, data from seven IMU sensors that are attached to the seven lower-body segments and three UWB tags are used in the proposed systems and methods. In addition, the lower-body skeleton model including its segments, joints, geometric parameters and the coordinate frames is also shown in FIG. 1. The parameters for the lower-body skeleton model are explained in Table 1. The navigation frame (n) is the reference coordinate system. The body segment frame (b) is the coordinate system attached to the uppermost point of each body segment. The b-frame is a general representation of the body segments when not explicitly specified by a segment name. The sensor frame (s) is the coordinate system attached to each IMU.

TABLE 1

Parameters for the lower-body skeleton model.

| Segment symbols: | | | Joint and end point symbols: | |
|---|---|---|---|---|
| Name | Subscript | Dimensions | Name | Subscript |
| Pelvis | pv | $d_{pv}$, $h_{pv}$ | Waist | w |
| Left thigh | lt | $h_{th}$ | Left hip | lh |
| Right thigh | rt | | Left knee | lk |
| Left shank | ls | $h_{sh}$ | Left ankle | la |
| Right shank | rs | | Left mid foot | lm |
| Left foot | lf | $d_{ft}$ | Right mid foot | rm |
| Right foot | rf | | | |

In the present disclosure the names of the various body segments (pelvis, thigh, shank, foot) are used in connection with discussions of orientation. In contrast, when discussing positions, reference is made to a localization point on each body segment where the localization tag is mounted. For example, for the pelvis, the localization tag is mounted on the waist, and for each foot, the localization tag is mounted at a mid foot location.

Figure 2:
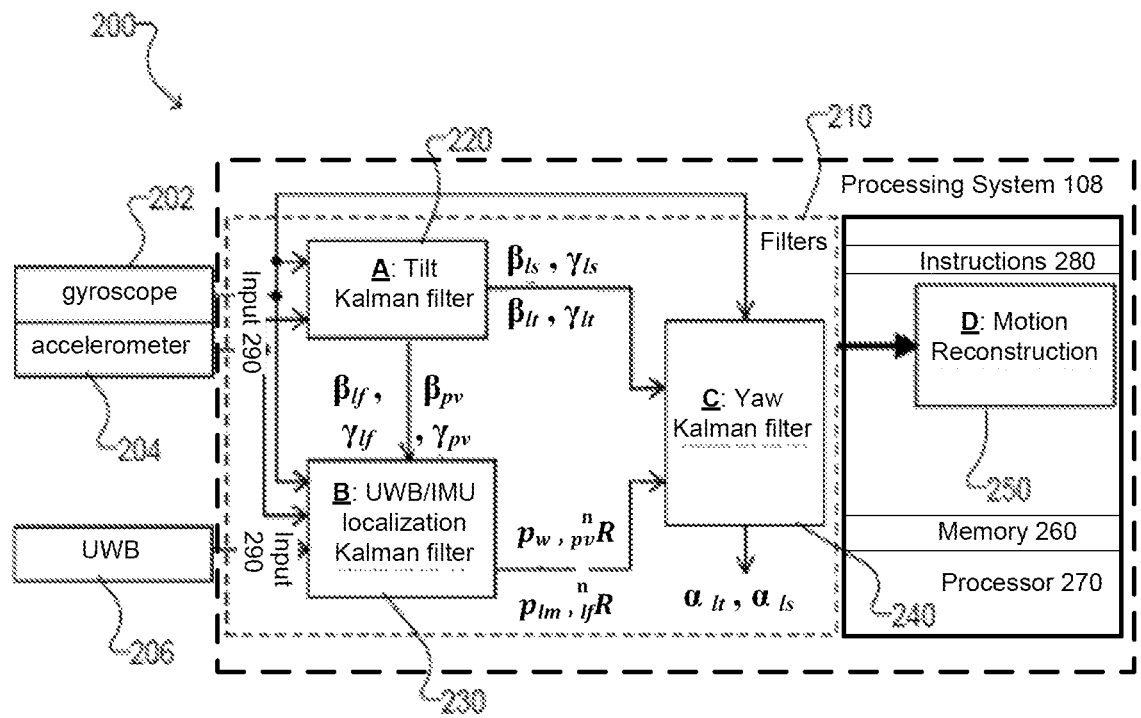
FIG. 2 is a block diagram schematically illustrating components of an example motion capture system according to one embodiment.

FIG. 2 shows the overall structure of an example system 200, with outputs labelled for the left half of the lower-body. Due to the similarity of the right and the left half of the lower-body, for the sake of brevity, the outputs of the components of system 200 are shown only for the left side. As shown in FIG. 2, the proposed system 200 comprises a gyroscope input 202 for receiving rate of turn signals from the IMUs, an accelerometer input 204 for receiving acceleration signals from the IMUs, a localization input 206 for receiving position signals from a localization system (e.g. the UWB sensor system in the illustrated example) and velocity signals derived therefrom, a plurality of filters 210, and a motion reconstruction block 250. The filters 210 include a tilt Kalman filter 220, a localization Kalman filter 230, and a yaw Kalman filter 240. Outputs from the tilt, localization and yaw Kalman filters 220, 230, and 240 are all provided to the motion reconstruction block 250, as indicated by the thick arrow from the filters 210 to the motion reconstruction block 250.

A typical MoCap system should be able to track the 3-D position of a localization point on the root segment (the waist joint in FIG. 1) and the 3-D orientation (including the two tilt angles and yaw angle) of the body segments. In system 200, the tilt Kalman filter 220 estimates the tilt angles (e.g., roll and pitch) for the seven body segments. The localization Kalman filter 230 estimates the position of the right and left mid foot and the waist as well as the yaw angles of the feet and pelvis. Next, the yaw Kalman filter 240 estimates the yaw angles of the thighs and shanks. Once all the 3-D position and orientation of the seven lower-body segments are obtained, the motion reconstruction block 250 provides the necessary correction for visual 3-D motion representation.

The magnetometer-free MoCap system 200 in FIG. 2 assumes that the sensor-to-segment calibration has been performed in priori and that the inertial data from the tri-axial accelerometer and gyroscope are provided in the b-frame for each segment rather than the s-frame of each sensor. This requires finding a rotation matrix from the s-frame to b-frame ($_s^bR$) for each segment during an initialization phase, which in turn requires a few seconds of access to magnetic data. Initialization is performed each time the system is used for a motion capture session, to account for the possibility of small differences in the position or orientation of the sensors. At the initialization phase, the human subject stands in such a way that the y axis of the navigation frame points to the anterior and the x axis points to the right, as shown in FIG. 1. During this initialization phase, which lasts only a couple of seconds, the 3-D inertial and magnetic data are processed to determine the rotation matrix from the sensor frame to the navigation frame ($_s^nR$) for each IMU, as disclosed in S. Zihajehzadeh, D. Loh, M. Lee, R. Hoskinson and E. J. Park, "A Cascaded Two-Step Kalman Filter for Estimation of Human Body Segment Orientation Using MEMS-IMU," *Conf. Proc. IEEE Eng. Med. Biol. Soc.*, Chicago, Ill., August 2014, pp. 6270-6273, which is hereby incorporated by reference herein. Based on FIG. 1, the coordinate frame of each body segment (only the coordinate frame for the left thigh is shown in FIG. 1) is aligned with the navigation frame during the initialization, resulting in $_s^bR=_s^nR$. Note that the few seconds of initial sensor-to-segment calibration is the only occasion that the magnetic data are being used and that this static standing calibration happens at a certain location for a very short time. Thus, any magnetic disturbances during the calibration are generally constant and, as mentioned above, are of the type that can be removed by proper magnetometer calibration.

Before capturing the motion, calibration of an anatomical model stored in or accessible by the processing system 108 is carried out for every subject. This involves adjusting the model's parameters including the length of the rigid segments via manual measurements that are obtained based on anatomical landmarks on the body segments, similar to the approach used in X. L. Meng, Z. Q. Zhang, S. Y. Sun, J. K. Wu, and W. C. Wong, "Biomechanical model-based displacement estimation in micro-sensor motion capture," *Meas. Sci. Technol.*, vol. 23, no. 5, pp. 055101-1-11, May 2012, which is hereby incorporated by reference herein.

In the following, p and a subscripts denote the quantities for the localization Kalman filter 230 and the yaw Kalman filter 240, respectively.

Tilt Kalman Filter

The tilt Kalman filter 220 is based on the filtering techniques disclosed in J. K. Lee, E. J. Park, and S. Robinovitch, "Estimation of attitude and external acceleration using inertial sensor measurement during various dynamic conditions," *IEEE Trans. Instrum. Meas.*, vol. 61, no. 8, pp. 2262-2273, August 2012, which is hereby incorporated by reference herein, allowing accurate determination of roll and pitch angles. In the tilt Kalman filter 220, the tri-axial gyroscope and tri-axial accelerometer data in the body frame of each segment are used to estimate the normalized gravity vector in the body frame (i.e. the third row of the rotation matrix from the b-frame to n-frame, $_b^nR$):

$$_b^nR = \begin{bmatrix} c\alpha c\beta & c\alpha s\beta s\gamma - s\alpha c\gamma & c\alpha s\beta c\gamma + s\alpha s\gamma \\ s\alpha c\beta & s\alpha s\beta s\gamma + c\alpha c\gamma & s\alpha s\beta c\gamma - c\alpha s\gamma \\ -s\beta & c\beta s\gamma & c\beta c\gamma \end{bmatrix} \quad (1)$$

where $\alpha$ (yaw), $\beta$ (pitch) and $\gamma$ (roll) are the rotation angles about the Z-, Y-, and X-axes, respectively.

Using the estimated last row of the rotation matrix, the desired roll and pitch angles can be calculated. This tilt Kalman filter 220 outputs the roll and pitch angles for the seven segments including the feet (rf and lf), shanks (rs and ls), thighs (rt and lt) and pelvis (pv). These outputs for the left half of the lower-body are shown in FIG. 2.

UWB/IMU Localization Kalman Filter

The localization Kalman filter 230 provides drift-free position and 3D orientation of the feet and waist without using magnetometers. This filter 230 fuses IMUs with a UWB localization system for the following three localization points on the lower-body: the right and left mid foot (rm and lm) and the waist (w). It is designed to estimate the position vectors for these three points, as well as the first row of the rotation matrix $_b^nR$ for their three corresponding segments (rf, lf and pv, respectively). For the sake of brevity, the operation of the localization Kalman filter 230 is only explained for the point w on pv. By estimating the first row of the rotation matrix and using the tilt angles information from the tilt Kalman filter 220, the yaw angle can be estimated using:

$$\alpha_{pv} = \tan^{-1}\left(\frac{-_{pv}^nR_{1,2}c\gamma_{pv} + _{pv}^nR_{1,3}s\gamma_{pv}}{_{pv}^nR_{1,1}/c\beta_{pv}}\right) \quad (2)$$

where $_{pv}^nR_{i,j}$ represents the ith row and jth column in $_{pv}^nR$.

As shown in FIG. 2, the localization Kalman filter 230 uses the tri-axial gyroscope and tri-axial accelerometer data obtained from the IMUs, and the tri-axial position and velocity data obtained from the UWB system, in addition to the tilt angles data from the tilt Kalman filter 220. The following system model is employed by the localization Kalman filter 230:

$$x_\rho(k+1) = A_\rho(k)x_\rho(k) + B_\rho(k)u_\rho(k) + q_\rho(k) \quad (3)$$

$$y_\rho(k) = C_\rho(k)x_\rho(k) + m_\rho(k) \quad (4)$$

where $x_\rho$ is the state vector; $A_\rho$ is the state transition matrix; $B_\rho$ is the input matrix; $u_\rho$ is the input vector; $q_\rho$ is the process noise vector; $y_\rho$ is the measurement vector; $C_\rho$ is the measurement matrix; and $m_\rho$ is the measurement noise vector.

The state vector $x_\rho(k) = [p_w(k) \; v_w(k) \; z_{pv}(k)]^T$ is a 9×1 vector where $p_w$ and $v_w$ are the 3-D position and velocity vectors of the waist, respectively; and $z_{pv}$ is the first row of the rotation matrix $_{pv}^nR$ and is equal to:

$$z_{pv}(k) = [z_{1,pv}, z_{2,pv}, z_{3,pv}]$$

$$z_{1,pv} = c\alpha_{pv}c\beta_{pv} \quad (5)$$

$$z_{2,pv} = c\alpha_{pv}s\beta_{pv}s\gamma_{pv} - s\alpha_{pv}c\gamma_{pv}$$

$$z_{3,pv} = c\alpha_{pv}s\beta_{pv}c\gamma_{pv} + s\alpha_{pv}s\gamma_{pv}$$

The measurement vector $y_\rho$, consists of the 3-D position and velocity data obtained from the UWB system, i.e. $y_\rho(k) = [p_{UWB}(k)\ v_{UWB}(k)]^T$. Thus, $C_\rho$ can be written as:

$$C_\rho(k) = [I_{6\times 6}\ 0_{6\times 3}]. \quad (6)$$

Next, the following inertial navigation equations are used to calculate $A_\rho$ and $B_\rho$ matrices in the state space model of Eq. (3):

$$p_w(k+1) = p_w(k) + \Delta t\ v_w(k) \quad (7)$$

$$v_w(k+1) = v_w(k) + \Delta t({}_{pv}^{n}R(k)y_{A,pv}(k) - [00g]^T) \quad (8)$$

$$z_{pv}(k+1) = \Phi_{pv}(k)z_{pv}(k) \quad (9)$$

$$\Phi_{pv}(k) = I_{3\times 3} - \Delta t\tilde{y}_{G,pv}(k) \quad (10)$$

where $y_{A,pv}(k) = [a_x, a_y, a_z]^T$ is the bias compensated output vector of the accelerometer; g is the norm of the gravity vector; and $y_{G,pv}$ is tri-axial gyroscope measurements. The ~ operator denotes a skew-symmetric matrix function of a vector and $I_{3\times 3}$ is the 3×3 identity matrix. To find $A_\rho$, $B_\rho$ and $u_\rho$, ${}_{pv}^{n}R(k)$ in Eq. (8) is re-written in terms of the three elements of the $z_{pv}$ vector and the known tilt angles from the tilt Kalman filter 220 as follows:

$$_{pv}^{n}R11 = \begin{bmatrix} z_{1,pv} \\ c\beta_{pv}(-c\gamma_{pv}z_{2,pv} + s\gamma_{pv}z_{3,pv}) \\ -s\beta_{pv} \end{bmatrix} \quad (11)$$

$$_{pv}^{n}R12 = \begin{bmatrix} z_{2,pv} \\ s\gamma_{pv}s\beta_{pv}(-c\gamma_{pv}z_{2,pv} + s\gamma_{pv}z_{3,pv}) + \dfrac{s\beta_{pv}z_{1,pv}}{c\beta_{pv}} \\ s\gamma_{pv}c\beta_{pv} \end{bmatrix}$$

$$_{pv}^{n}R13 = \begin{bmatrix} z_{3,pv} \\ s\gamma_{pv}s\beta_{pv}(-c\gamma_{pv}z_{2,pv} + s\gamma_{pv}z_{3,pv}) - s\gamma_{pv}\dfrac{z_{1,pv}}{c\beta_{pv}} \\ s\gamma_{pv}c\beta_{pv} \end{bmatrix}$$

$$_{pv}^{n}R(k) = [{}_{pv}^{n}R11\ {}_{pv}^{n}R12\ {}_{pv}^{n}R13].$$

By substituting Eq. (11) into Eq. (8) and using Eqs. (7)-(10), $A_\rho$, $B_\rho$, and $u_\rho$ can be obtained, i.e.:

$$A_\rho(k) = \begin{bmatrix} I_{3\times 3} & \Delta t I_{3\times 3} & 0_{3\times 3} \\ 0_{3\times 3} & I_{3\times 3} & A_{23}(k) \\ 0_{3\times 3} & 0_{3\times 3} & \Phi_{pv}(k) \end{bmatrix} \quad (12)$$

$$A_{23}(k) = \Delta t \begin{bmatrix} a_x & a_y & a_z \\ k_1 & k_2 & k_3 \\ 0 & 0 & 0 \end{bmatrix} \quad (13)$$

$$u_\rho(k) = [y_{A,pv}(k)^T\ g]^T \quad (14)$$

$$B_\rho(k) = \begin{bmatrix} 0_{5\times 4} \\ -\Delta ts\beta_{pv} & \Delta ts\gamma_{pv}c\beta_{pv} & \Delta tc\gamma_{pv}c\beta_{pv} & -\Delta t \\ 0_{3\times 4} \end{bmatrix} \quad (15)$$

where $k_1$ to $k_3$ are as follows:

$$k_1 = a_y c\gamma_{pv}/c\beta_{pv} - a_z s\gamma_{pv}/c\beta_{pv} \quad (16)$$

$$k_2 = -c\gamma_{pv}c\beta_{pv}a_x - c\gamma_{pv}s\gamma_{pv}s\beta_{pv}a_y - c\gamma_{pv}s\gamma_{pv}s\beta_{pv}a_z$$

$$k_3 = s\gamma_{pv}c\beta_{pv}a_x + (s\gamma_{pv})^2 s\beta_{pv}a_y + (s\gamma_{pv})^2 s\beta_{pv}a_z.$$

The process and measurement noise covariance matrices in the localization Kalman filter 230, $Q_\rho(k)$ and $M_\rho(k)$, are calculated using the following equations:

$$Q_\rho(k) = E[q_\rho(k)q_\rho(k)^T] = \quad (17)$$

$$\begin{bmatrix} \frac{1}{2}\Delta t^2 I_{3\times 3} & 0_{3\times 3} \\ \Delta t I_{3\times 3} & 0_{3\times 3} \\ 0_{3\times 3} & -\Delta t\tilde{z}_{pv}(k) \end{bmatrix} \begin{bmatrix} \Sigma_A & 0_{3\times 3} \\ 0_{3\times 3} & \Sigma_G \end{bmatrix} \begin{bmatrix} \frac{1}{2}\Delta t^2 I_{3\times 3} & 0_{3\times 3} \\ \Delta t I_{3\times 3} & 0_{3\times 3} \\ 0_{3\times 3} & -\Delta t\tilde{z}_{pv}(k) \end{bmatrix}^T$$

$$M_\rho(k) = E[m_\rho(k)m_\rho(k)^T] = \begin{bmatrix} \Sigma_{p,UWB} & 0_{3\times 3} \\ 0_{3\times 3} & \Sigma_{v,UWB} \end{bmatrix} \quad (18)$$

where $\Sigma_G$ and $\Sigma_A$ are the covariance matrix of the gyroscope's and accelerometer's measurement noise respectively. By assuming that their noise variances for the gyroscope and accelerometer are equal to $\Sigma_G^2$ and $\sigma_A^2$, $\Sigma_G$ and $\Sigma_A$ are set to $\sigma_G^2 I_{3\times 3}$ and $\sigma_A^2 I_{3\times 3}$. $\Sigma_{p,UWB}$ and $\Sigma_{v,UWB}$ are the UWB position and velocity noise covariance matrices at each step. These matrices are obtained from the UWB system and define its localization accuracy at each step. Thus, when UWB position measurement is not accurate (such as the inaccuracies that happen as a result of reflections and NLOS conditions), these covariance matrices become higher, which forces the localization Kalman filter 230 to rely more on the inertial data rather than the UWB measurements.

Zero Velocity Update

The ground contact of the feet can improve the localization through the use of zero velocity update (ZUPT), as described for example in E. Foxlin, "Pedestrian Tracking with Shoe-Mounted Inertial Sensors," *IEEE Comput. Graphic. Applicat.*, vol. 25, no. 6, pp. 38-46, December 2005 and I. Skog, H. Peter, J. Nilsson, and J. Rantakokko, "Zero-Velocity Detection—An Algorithm Evaluation," *EEE Trans. Biomed. Eng.*, vol. 57, no. 11, November 2010, which are hereby incorporated by reference herein. Thus, for tracking the right and left mid foot, the stance detection based on angular rate energy and ZUPT during the stance period is employed in the localization Kalman filter 230.

Finally, using the known tilt angles from the tilt Kalman filter 220 and the estimated yaw angle from Eq. (2), the rotation matrix for each of the three mentioned body segments can be calculated using Eq. (1).

Smoothing

In some embodiments, the Rauch-Tung-Striebel (RTS) smoothing algorithm (as described for example in S. Zihajehzadeh, T. J. Lee, J. K. Lee, R. Hoskinson and E. J. Park, "Integration of MEMS Inertial and Pressure Sensors for Vertical Trajectory Determination," *IEEE Trans. Instrum. Meas.*, vol. 64, no. 3, pp. 804-814, March 2015, which is hereby incorporated by reference herein), a widely used smoothing algorithm in navigation applications, is utilized in the localization Kalman filter 230. The RTS smoother recursively updates the smoothed estimate and its covariance in a backward sweep using the following equations:

$$K_s(k) = L^+(k)A_\rho(k)[L^-(k+1)]^{-1} \quad (19)$$

$$L_s(k) = L^+(k) + K_s(k)[L_s(k+1) - L^-(k+1)]K_s(k)^T \quad (20)$$

$$x_{\rho s}(k) = x_\rho^+(k) + K_s(k)[x_s(k+1) - x_\rho^-(k+1)] \quad (21)$$

where $L^+$ and $L^-$ are the "a posteriori" and the "a priori" covariance estimates in the Kalman filter; $K_s$ is the smoother gain; $x_p^+$ and $x_p^-$ are the "a posteriori" and the "a priori" state estimates; and $x_{ps}$ is the smoothed state vector of the localization filter.

At the end, as shown in FIG. 2 for the left side of the lower-body, the localization filter 230 outputs the 3-D position of the mid feet ($p_{lm}$, $p_{rm}$) and the waist ($p_w$) and the 3-D orientation of the feet ($_{lf}^n R$, $_{rf}^n R$) and pelvis ($_{pv}^n R$) to the yaw Kalman filter 240.

Yaw Kalman Filter

The yaw Kalman filter 240 uses the position of the waist and the mid feet, the tilt angles of the thighs and shanks, and the rate of turn measurements from the IMUs attached to the thighs to estimate the first row of the thigh rotation matrices $_{lt}^n R(k)$ and $_{rt}^n R(k)$, which are needed to calculate the yaw angle of the thighs and the shanks. Herein, the processing carried out by the yaw Kalman filter 240 is explained for the left side of the lower-body.

The yaw Kalman filter 240 assumes the same yaw angle for the thigh ($\alpha_{lt}$) and shank. This implies that the yaw angle estimation filter assumes the internal/external rotation of the knee to be negligibly small, which is the case for uninjured knees. This filter uses the following system model:

$$x_\alpha(k+1) = A_\alpha(k)x_\alpha(k) + q_\alpha(k) \quad (22)$$

$$y_\alpha(k) = C_\alpha(k)x_\alpha(k) + m_\alpha(k) \quad (23)$$

where $x_\alpha(k) = [z_{1,lt}\ z_{2,lt}\ z_{3,lt}]^T$ is a 3×1 state vector consisting of the first row of the rotation matrix $_{lt}^n R(k)$, $A_\alpha$, $q_\alpha$, $y_\alpha$, $C_\alpha$ and $m_\alpha$ are the state transition matrix, process noise vector, measurement vector, measurement matrix and measurement noise vector, respectively, all for the yaw Kalman filter 240.

Thus, $$A_\alpha(k) = I_{3\times 3} - \Delta t \tilde{y}_{G,lt}(k) \quad (24)$$

where $\tilde{y}_{G,lt}$ is the skew symmetric matrix of the thigh gyroscope measurement. (k) is a 2×1 vector consisting of the horizontal components of the position vector from the hip to ankle ($p_{lh\text{-}la}(k)$). Since the internal/external rotation of the knee is assumed to be negligible, with the known inclination of the thigh and shank (obtained from the tilt Kalman filter 220), their orientation around the vertical axis (i.e. the yaw angle) will not affect the vertical component of $p_{lh\text{-}la}(k)$. Thus, this vertical component does not provide any information for the yaw angle estimation. By using the information from the localization Kalman filter 230, $y_\alpha(k)$ is calculated as follows:

$$p_{lh}(k) = p_w(k) + _{pv}^n R(k)[-d_{pv}\ 0\ -h_{pv}]^T \quad (25)$$

$$p_{la}(k) = p_{lm}(k) - _{lf}^n R(k)[0\ d_{ft}\ 0]^T \quad (26)$$

$$y_\alpha(k) = p_{lh\text{-}la}(k)|_{x,y} = p_{la}(k)|_{x,y} - p_{lh}(k)|_{x,y}. \quad (27)$$

To calculate $C_\alpha(k)$ in Eq. (23), $y_\alpha(k)$ should be written in terms of the state vector $x_\alpha(k)$ (see Appendix A) as:

$$r_{lh\text{-}la}(k)|_x = \begin{bmatrix} \frac{h_{sh}}{c\beta_{ls}} s\beta_{ls}c\gamma_{ls} \\ -c\gamma_{lt}s\gamma_{ls}h_{sh} \\ h_{th} + s\gamma_{ls}h_{sh}s\gamma_{lt} \end{bmatrix}^T \begin{bmatrix} z_{1,lt} \\ z_{2,lt} \\ z_{3,lt} \end{bmatrix} = C11_\alpha x_\alpha(k) \quad (28)$$

$$r_{lh\text{-}la}(k)|_y = \begin{bmatrix} -s\gamma_{lt}h_{th} - s\gamma_{ls}h_{sh} \\ k_{3,th} \\ -(c\gamma_{lt})^2 s\beta_{lt}h_{th} - c\gamma_{lt}c\gamma_{ls}s\beta_{ls}h_{sh} \\ c\gamma_{lt}s\gamma_{lt}s\beta_{lt}h_{th} + s\gamma_{lt}c\gamma_{ls}s\beta_{ls}h_{sh} \end{bmatrix}^T \begin{bmatrix} z_{1,lt} \\ z_{2,lt} \\ z_{3,lt} \end{bmatrix} = $$

$$C21_\alpha x_\alpha(k). \quad (29)$$

Then, $C_\alpha(k)$ can be written as:

$$C_\alpha(k) = \begin{bmatrix} C11_\alpha \\ C21_\alpha \end{bmatrix} \quad (30)$$

Finally, the process and measurement noise covariance matrices in the yaw Kalman filter, $Q_\alpha(k)$ and $M_\alpha(k)$, are calculated using the following equations [40]:

$$Q_\alpha(k) = E[q_\alpha(k)q_\alpha(k)^T] = -(\Delta t)^2 \tilde{x}_\alpha(k) \Sigma_G \tilde{x}_\alpha(k) \quad (31)$$

$$M_\alpha(k) = E[m_\alpha(k)m_\alpha(k)^T] = \begin{bmatrix} \sigma_{\alpha,x}^2 & 0 \\ 0 & \sigma_{\alpha,y}^2 \end{bmatrix} \quad (32)$$

where $\sigma_{\alpha,x}^2$ and $\sigma_{\alpha,y}^2$ are the measurement variances for the two horizontal components of $y_\alpha$, which depends on the localization accuracy of the hip and ankle.

Motion Reconstruction Block

Figure 2A:
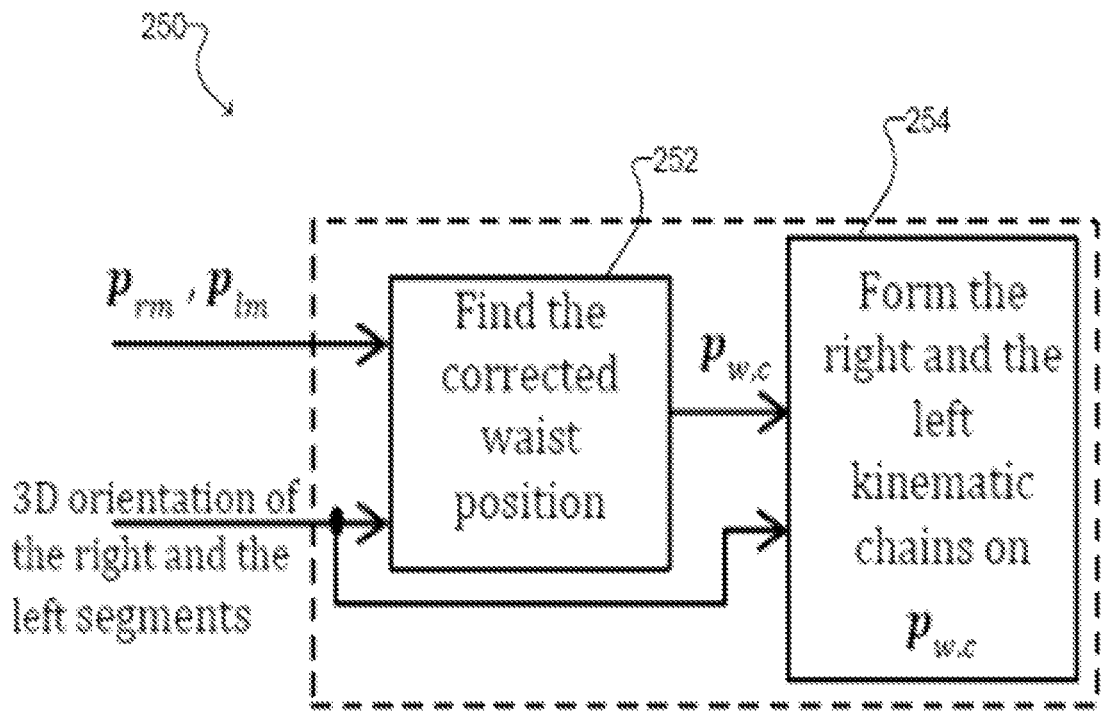
FIG. 2A shows an example motion reconstruction block for the system of FIG. 2 according to one embodiment.

The motion reconstruction block 250 uses the position and orientation data from the above three filters 220, 230 and 240 to reconstruct the full 3-D motion of the lower-body. As mentioned above, the mid feet localization tends to be more accurate than the localization of the waist due to the use of ZUPT. Thus, as shown in FIG. 2A, the motion reconstruction block uses the position of the mid feet and the 3-D orientation of the lower-body segments to find the position of the waist and build the lower body model (in FIG. 1) using the following steps:

1) The corrected position of the waist is calculated in a waist correction block 252 as:

$$p_{w,l}(k) = p_{lm}(k) - _{lf}^n R(k)\begin{bmatrix} 0 \\ d_{ft} \\ 0 \end{bmatrix} - \quad (33)$$

$$_{ls}^n R(k)\begin{bmatrix} 0 \\ 0 \\ -h_{sh} \end{bmatrix} - _{lt}^n R(k)\begin{bmatrix} 0 \\ 0 \\ -h_{th} \end{bmatrix} - _{pv}^n R(k)\begin{bmatrix} -d_{pv} \\ 0 \\ -h_{pv} \end{bmatrix}$$

$$p_{w,r}(k) = p_{rm}(k) - _{rf}^n R(k)\begin{bmatrix} 0 \\ d_{ft} \\ 0 \end{bmatrix} - \quad (34)$$

$$_{rs}^n R(k)\begin{bmatrix} 0 \\ 0 \\ -h_{sh} \end{bmatrix} - _{rt}^n R(k)\begin{bmatrix} 0 \\ 0 \\ -h_{th} \end{bmatrix} - _{pv}^n R(k)\begin{bmatrix} -d_{pv} \\ 0 \\ -h_{pv} \end{bmatrix}$$

$$p_{w,c}(k) = \frac{p_{w,l}(k) + p_{w,r}(k)}{2} \quad (35)$$

where $p_{w,l}$ and $p_{w,r}$ are the calculated waist position using the left and the right legs, respectively, and the $p_{w,c}$ is the corrected waist position.

2) The right and left legs are reconstructed as two kinematic chains in a reconstruction block 254, using $p_{w,c}(k)$ as the root position.

Figure 2B:
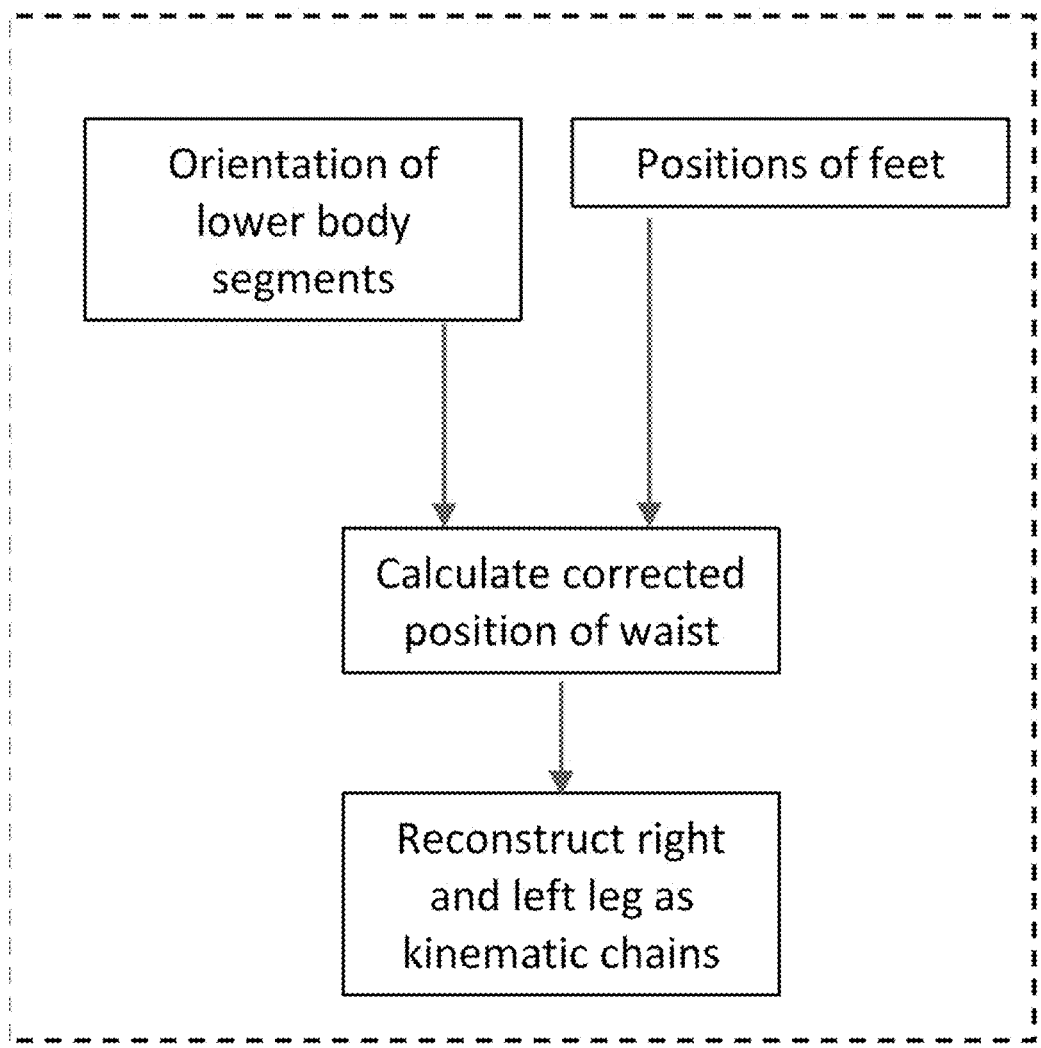
FIG. 2B shows an example tilt Kalman Filter for the system of FIG. 2 according to one embodiment.
Figure 3:
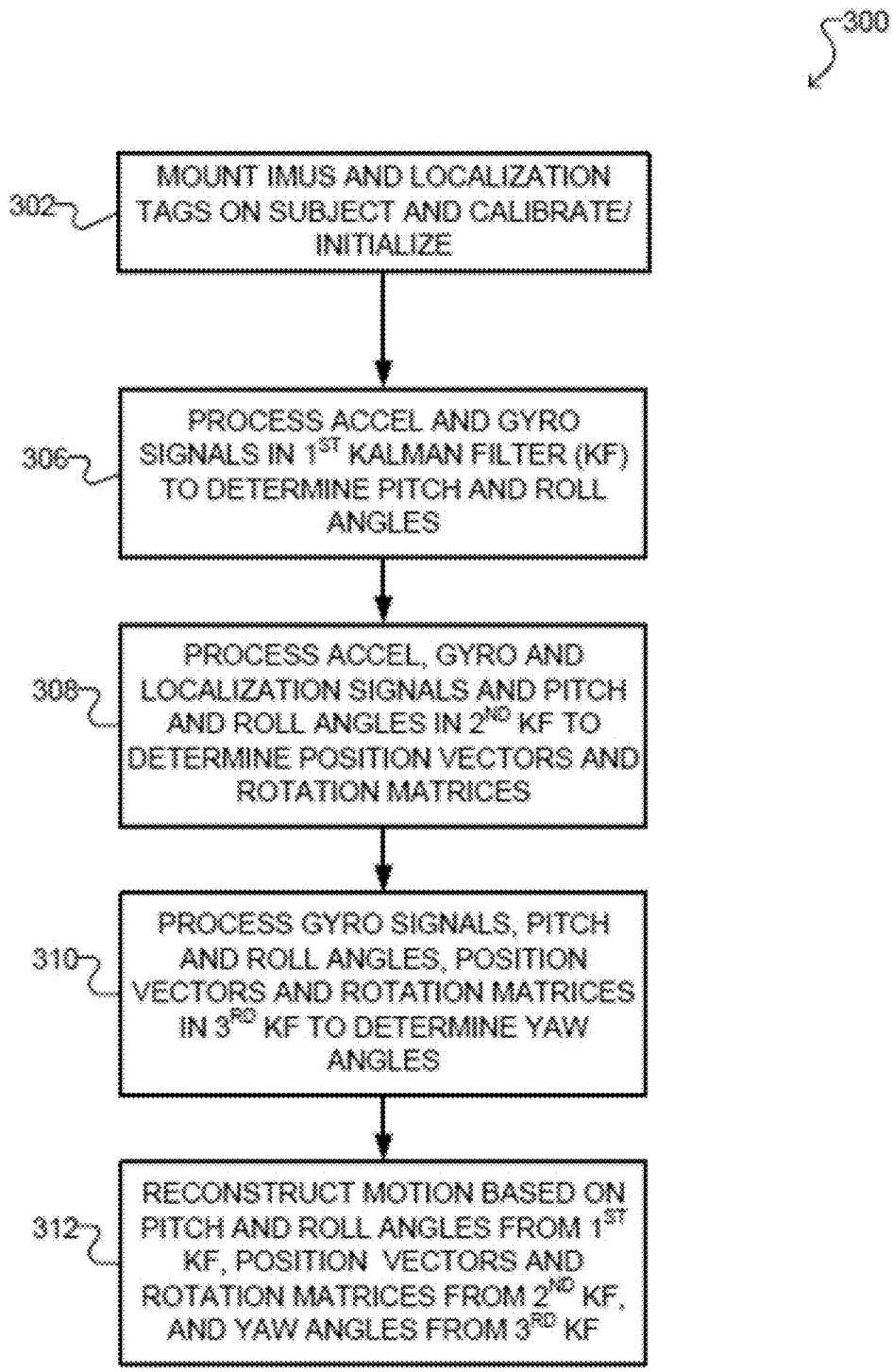
FIG. 3 is a flowchart illustrating steps of an example motion capture method according to one embodiment.

FIG. 2B shows an example motion reconstruction block 250 for the system of FIG. 2 according to another embodiment. FIG. 3 shows an example method 300 for capturing motion of a subject according to one embodiment. The method 300 begins with mounting IMUs and UWB tags (or other localization tags) on the subject, and calibrating/ initializing the system at step 302. An IMU is mounted on each of a plurality of body segments of interest. The body segments of interest form one or more kinematic chains, and each kinematic chain has a root segment and an end segments. In the case of the lower body of a human subject, there are two kinematic chains, with the waist forming the root segment of each chain, and the left and right feet forming the end segments. A localization tag is mounted at a localization point on each root and end segment (e.g. the mid feet and waist for lower body motion capture). As discussed above, the system is calibrated for a particular subject by updating parameters of an anatomical model for that subject, and initialized using a few seconds of magnetic data to determine the appropriate rotation matrices for the sensor frames.

At step 306, acceleration and rate of turn signals from the IMUs are processed in a first Kalman filter to determine pitch and roll angles for each of the body segments of interest. At step 308, acceleration and rate of turn signals from the IMUs and position signals from a localization system (as well as velocity signals, which may be provided directly by the localization system or derived from the position signals) are processed in a second Kalman filter, which also receives the pitch and roll angles from the first Kalman filter, to determine a position vector and rotation matrix for each of the root and end segments. At step 310, the rate of turn signals from the IMUs, the pitch and roll angles from the first Kalman filter, and the position vectors and rotation matrices from the second Kalman filter are processed in a third Kalman filter to determine yaw angles for the body segments other than the root and end segments. At step 312, full 3D motion of the body segments of interest is reconstructed based on the pitch and roll angles from the first Kalman filter, the position vectors and rotation matrices from the second Kalman filter, and the yaw angles from the third Kalman filter. Motion reconstruction at step 312 may also include determining a corrected position of a root segment based on end segment positions, as described above for the waist and feet with reference to FIG. 2A.

III. Experimental Setup and Protocol

A. Experimental Setup

Figure 4:
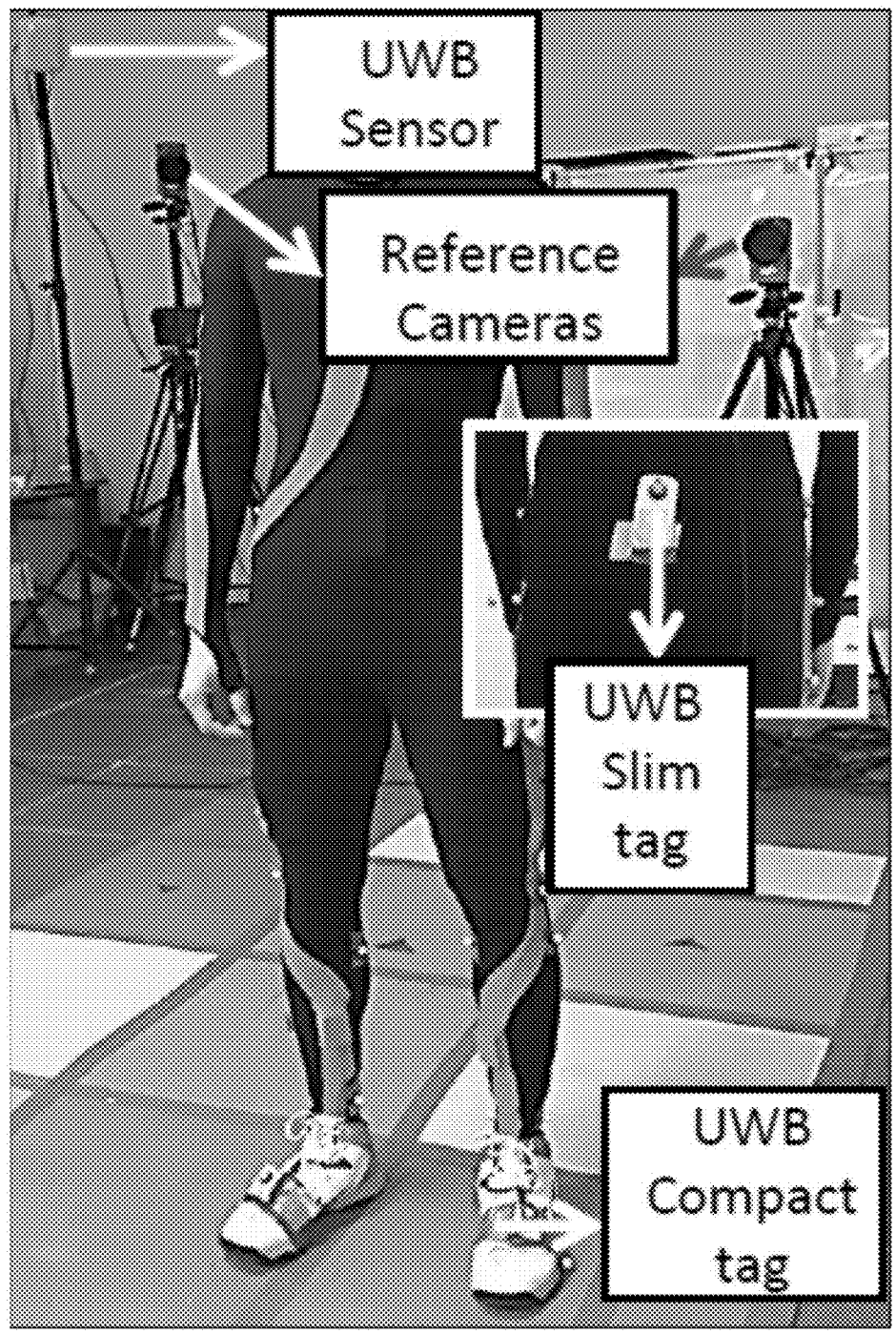
FIG. 4 is a photograph showing an experimental setup for testing a prototype motion capture system according to one embodiment.

In order to evaluate the performance of the proposed methods and systems, raw inertial data from an Xsens MVN suit (FIG. 4) was collected. Since the focus of this study is on the lower body, only seven MTx units were embedded in the MVN suit, including one unit on the waist and six units for the right and left thighs, shanks and feet. Each MTx unit consists of a tri-axial gyroscope, a tri-axial accelerometer and a tri-axial magnetometer. The magnetic data is only used for the initialization phase, as discussed above, and the inertial data is collected at the rate of 100 Hz throughout the experiment. As for the UWB-based localization system, Ubisense Series 7000 was used in this study. This UWB system consists of four anchor nodes ("sensors") and mobile nodes ("tags") and collects 3-D position data at the rate of about 10 Hz. As shown in FIG. 4, one slim tag is attached to the subject's waist and two compact tags are attached to the mid feet. The four UWB sensors are located at each corner of a 1.9×2.3 m rectangular-shaped test field. The manufacturer-specified localization accuracy of the UWB system is within 15 cm in 3-D space. A Qualisys optical MoCap system, with an accuracy of 0.25 mm, consisting of eight cameras is used as a reference system for the purpose of verification and the reflective markers are placed on the anatomical landmarks (FIG. 4). A GoPro Hero3+ camera was also used to capture the subject's body motion for further comparison.

It is important to mention that the reflective markers of the optical MoCap system are placed on the anatomical landmarks of the lower-body as suggested in T. Seel, J. Raisch, and T. Schauer, "IMU-based joint angle measurement for gait analysis.," *Sensors (Basel).*, vol. 14, no. 4, pp. 6891-909, April 2014. This is in contrast to other studies where the markers are used in clusters and placed on the IMU to eliminate any soft tissue and skin movement effects between the optical and inertial systems. However, placing the optical markers on the anatomical landmarks (which is a common practice in camera-based MoCap), allows benchmarking of the inertial MoCap against the optical MoCap rather than comparing the accuracy of the inertial and optical systems.

The parameters of the proposed Kalman filters were set as follows. $\sigma_A^2$, and $\sigma_G^2$ were obtained from static measurements and set to $10^{-4}$ m²/s⁴ and $10^{-4}$ rad²/s², respectively. $\Sigma_{p,UWB}$ and $\Sigma_{v,UWB}$ were obtained from the UWB system for each measurement. $\sigma_{\alpha,x}^2$ and $\sigma_{\alpha,y}^2$ were obtained from the corresponding diagonal elements of the covariance matrix in the localization Kalman filter.

B. Experimental Protocol

Our lab-based experiments were designed to simulate the types of activities that frequently happen in MoCap applications for gaming and entertainment. Thus, the experimental trials included walking and jogging around the 1.9×2.3 m rectangular test field; jumping on diagonal and around the field; stairs ascending/descending and stairs ascending/jumping-off (FIG. 12). Each trial was dedicated to one type of motion with the duration of about 100 s. The latter two experiments were specifically designed to introduce considerable height variations. In order to provide a statistical analysis, the trials were repeated for four times for each type of motion and twenty trials were performed in total. The subject of the experimental trials was a physically fit, 28 year old male with a height of 180 cm and a weight of 73 Kg.

IV. Experimental Results and Discussion

A. Performance of the UWB/IMU Localization Kalman Filter

Figure 5A:
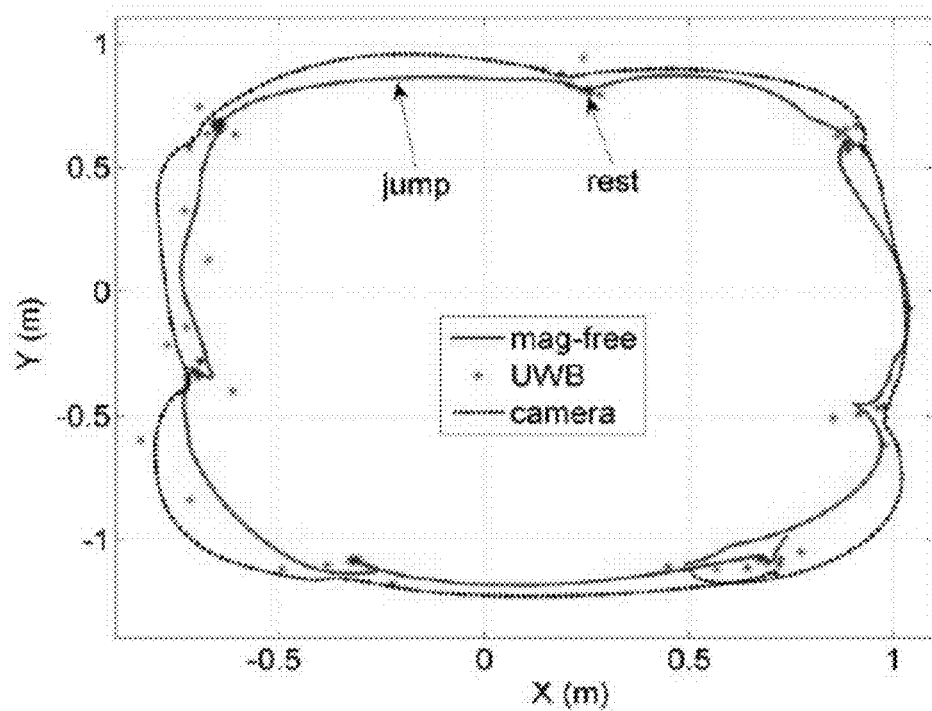
FIG. 5A is a graph showing horizontal trajectory of the waist for a typical jumping trial.
Figure 5B:
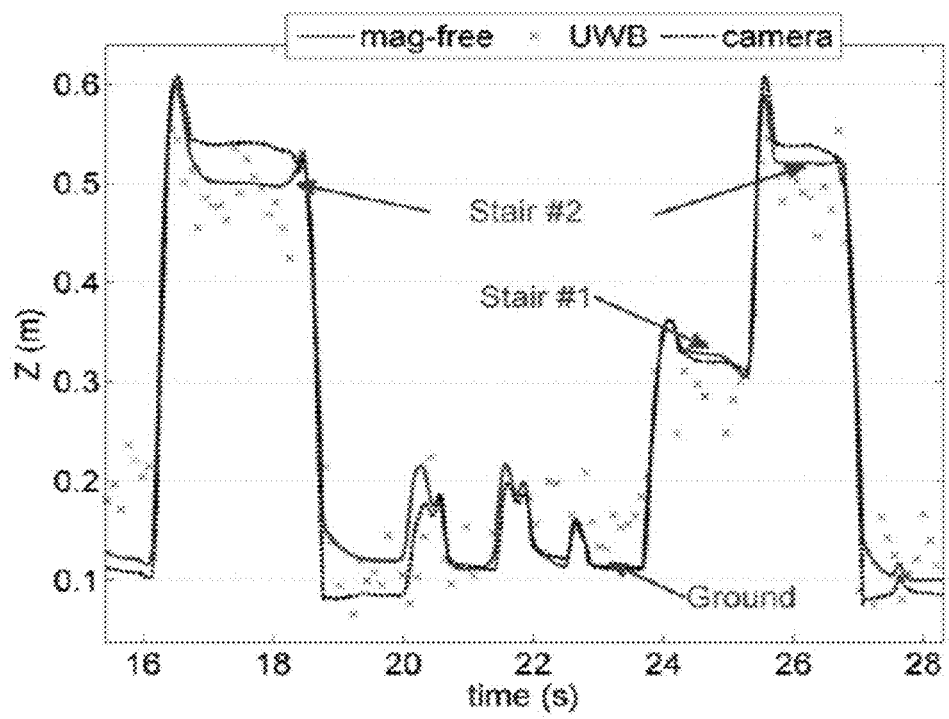
FIG. 5B is a graph showing vertical trajectory of the left foot for a typical stairs ascending/descending trial.

The performance of the proposed UWB/IMU fusion Kalman filter in 3-D localization and yaw angle estimation is investigated in this section. FIG. 5(*a*) shows the trajectory of the waist for a typical jumping trial that involves jumping with both legs around the test field. Since the jumps happen quickly and the sampling rate of the UWB is relatively low, the UWB position measurements are more concentrated in the rest periods between the jumps than during the jumps. However, as shown in FIG. 5(*a*), the proposed systems and methods (indicated by the "mag-free" solid line) can accurately bridge the UWB gaps during the jumps. FIG. 5(*b*) shows the estimated vertical trajectory (indicated by the "mag-free" solid line) of the left foot during a stair ascending/descending trial. As it can be seen in this figure, the proposed filter can overcome the fluctuations in UWB measurements in the vertical direction and provides accurate and drift-free trajectory estimation in the vertical direction.

Figure 6:
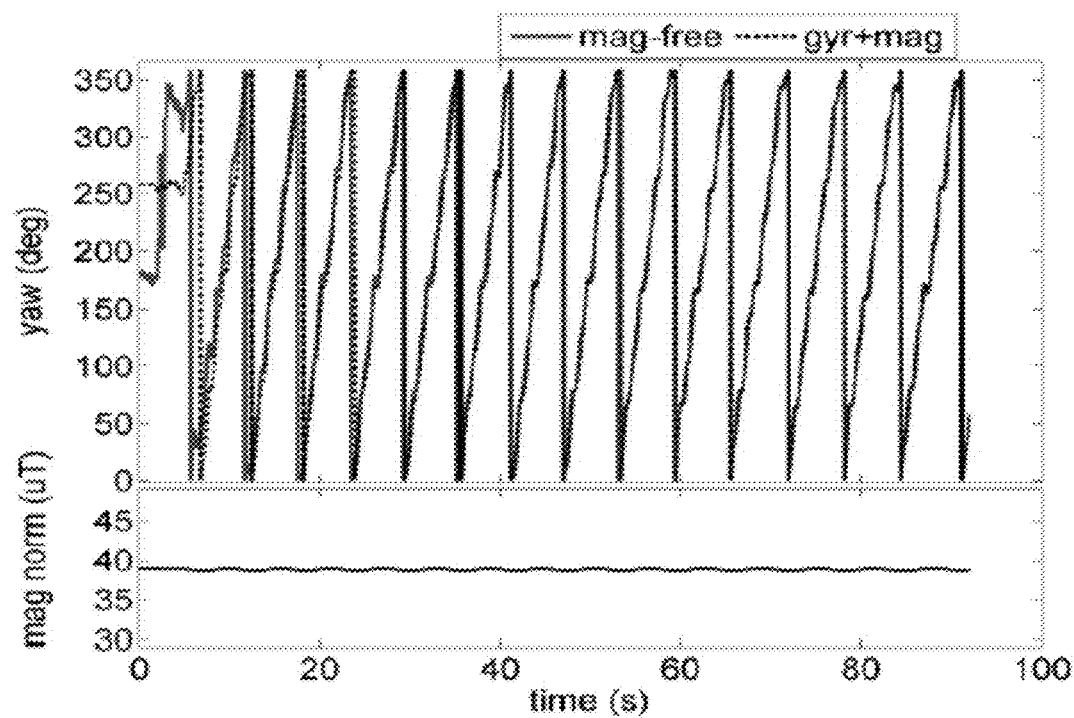
FIG. 6 is a graph showing yaw angle of the waist for a typical jogging trial and the norm of magnetic field during the trial.

FIG. 6 (top) shows the result of yaw angle estimation (indicated by the "mag-free" solid line) for the pelvis during a typical jogging trial. The reference yaw angle is calculated by employing magnetic data in addition to accelerometer and gyroscope measurements using the previously validated method described in S. Zihajehzadeh, D. Loh, M. Lee, R. Hoskinson and E. J. Park, "A Cascaded Two-Step Kalman Filter for Estimation of Human Body Segment Orientation Using MEMS-IMU," *Conf. Proc. IEEE Eng. Med. Biol. Soc.*, Chicago, Ill., August 2014, pp. 6270-6273. To ensure the accuracy of the reference curve, as shown in FIG. 6 (bottom), the experiment took place in a uniform magnetic field, away from magnetic disturbances. As shown by the solid red (mag-free) curve in FIG. 6 (top), since the magnetic data is not used in the proposed magnetometer-free systems and methods (other than in the initialization phase), the initial yaw angle is not known and is assigned an arbitrary initial value at the start of motion capture (180 degree in this case). However, after about 20 s from the start of the motion, the yaw angle will converge to the magnetometer-aided solution. The time it takes for the estimated yaw angle to converge is due to the fact that the filter requires some motion to build the correlation between the states and correct for the initial unknown yaw angle.

Figure 7:
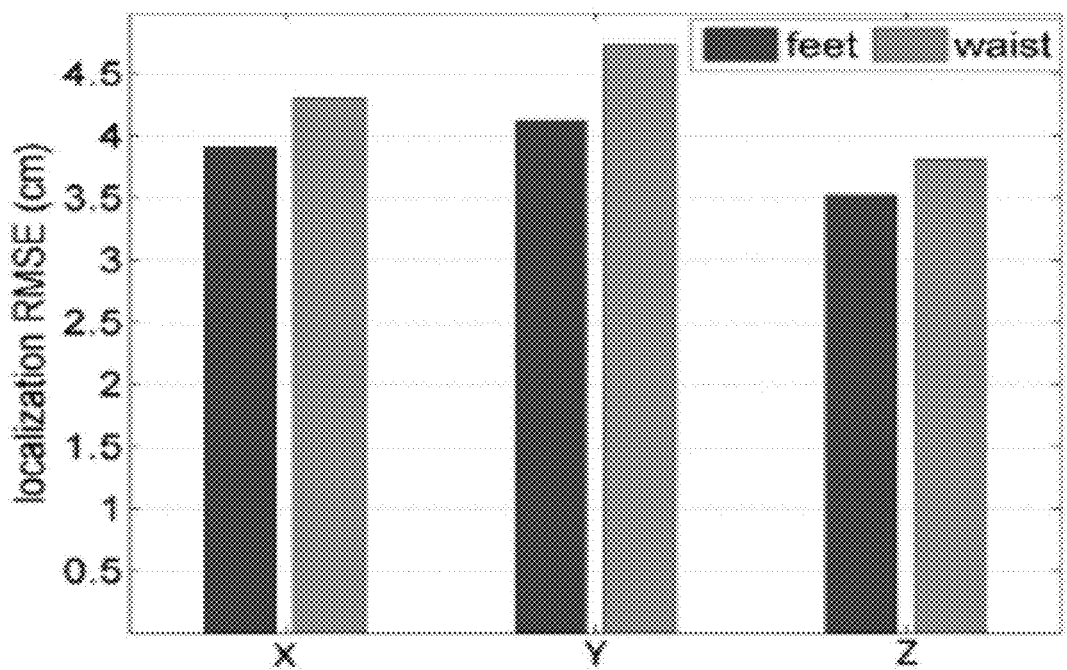
FIG. 7 is a graph showing 3-D localization accuracy for the feet and the waist.

FIG. 7 shows the 3-D localization root-mean-square-error (RMSE) for the feet and the waist calculated over the twenty experimental trials. This figure shows that the proposed systems and methods have a slightly better accuracy for tracking of the feet compared to the waist, which is the improvement that ZUPT can bring for foot tracking. In general the tracking accuracy is better than about 4.5 cm in 3-D spaces. This obtained accuracy is similar to the reported accuracy of about 4 cm in J. A. Corrales, F. A. Candelas, and F. Torres, "Sensor data integration for indoor human tracking," *Rob. Auton. Syst.*, vol. 58, no. 8, pp. 931-939, August 2010 for waist tracking using a magnetometer-aided UWB/IMU fusion Kalman filter.

B. Performance of the Yaw Kalman Filter

Figure 8:
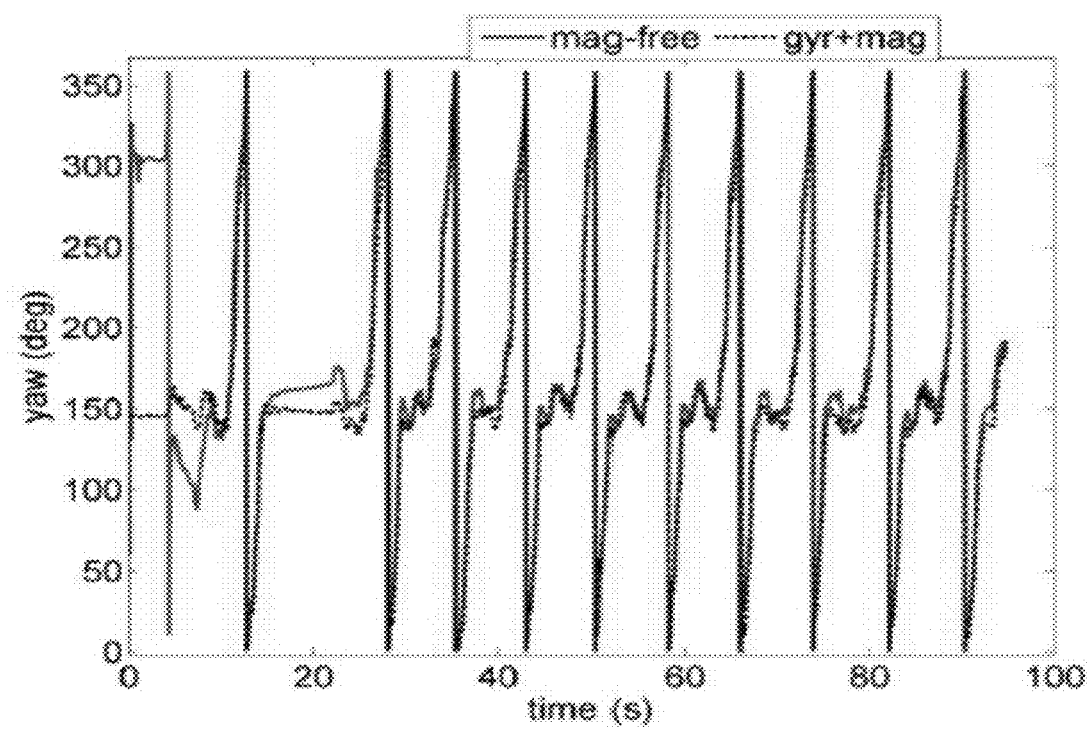
FIG. 8 is a graph showing yaw angle of the left thigh for a typical stairs ascending/descending trial.

The result of yaw angle estimation (indicated by the "mag-free" solid line) for the left thigh from the yaw Kalman filter for a typical stairs ascending/descending trial is shown in FIG. 8. Similar to FIG. 6, the reference curve in FIG. 8 is obtained from the magnetic-aided algorithm in S. Zihajehzadeh, D. Loh, M. Lee, R. Hoskinson and E. J. Park, "A Cascaded Two-Step Kalman Filter for Estimation of Human Body Segment Orientation Using MEMS-IMU," *Conf. Proc. IEEE Eng. Med. Biol. Soc.*, Chicago, Ill., August 2014, pp. 6270-6273, and the magnetic field is uniform during the trial. As shown in FIG. 8, similar to the yaw angle estimation in the localization Kalman filter, the unknown arbitrary initial yaw angle fluctuates for about 20 s and then converges to the reference curve.

Figure 9:
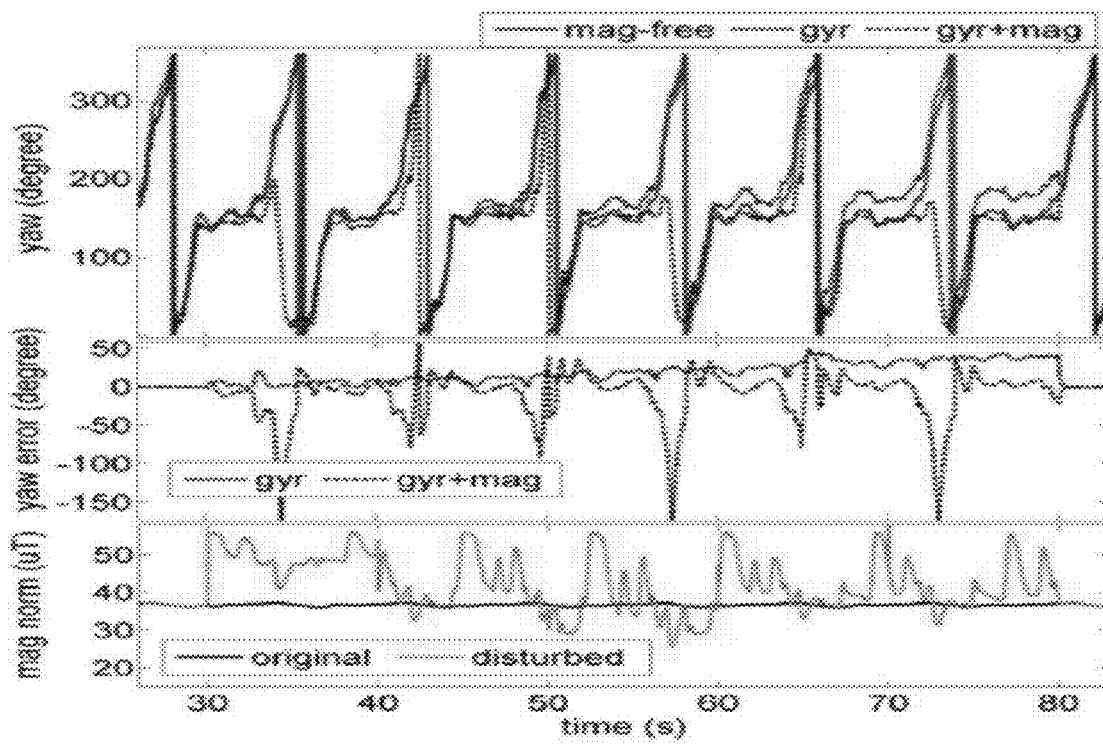
FIG. 9 is a graph showing yaw angle estimation under simulated magnetic disturbance from 30 s to 80 s.

The superiority of the proposed magnetometer-free systems and methods over the traditional magnetic-aided techniques manifests itself when yaw tracking is required in the presence of magnetic disturbances. A common method in the literature to overcome the magnetic disturbances is to rely on gyroscope for the duration of the disturbance. To investigate the effect of magnetic disturbances, as shown in FIG. 9 (bottom), a 50 s long magnetic disturbance is added to the uniform magnetic field. Based on T. H. Riehle, S. M. Anderson, P. A. Lichter, N. A. Giudice, S. I. Sheikh, R. J. Knuesel, D. T. Kollmann, D. S. Hedin, and A. P. Hardware, "Indoor Magnetic Navigation for the Blind," in *Conf. Proc. IEEE Eng. Med. Biol. Soc.*, San Diego, Calif., USA, August 2012, pp. 1972-1975, the norm of the magnetic field varies about 50% of its nominal value in a typical indoor environment and thus the disturbance is simulated accordingly. FIG. 9 (top) benchmarks the performance of the proposed magnetometer-free systems and methods (indicated by the "mag-free" solid line) against the magnetometer-aided technique described in S. Zihajehzadeh, D. Loh, M. Lee, R. Hoskinson and E. J. Park, "A Cascaded Two-Step Kalman Filter for Estimation of Human Body Segment Orientation Using MEMS-IMU," *Conf. Proc. IEEE Eng. Med. Biol. Soc.*, Chicago, Ill., August 2014, pp. 6270-6273 under the influence of magnetic disturbances, with the following two specific cases of the latter. The black dotted line (designated as gyr+mag) is the yaw angle solution when the magnetic disturbance is not identified and the magnetometer-aided technique fuses both inertial and magnetic data to calculate the yaw angle (Case A). The blue dotted line (designated as gyr) is the case where the disturbance is identified—i.e. the disturbed magnetic data is removed by the filter and the gyroscope data is used during the disturbance (Case B). The red solid curve is the estimated yaw from the proposed magnetometer-free yaw Kalman filter. The error in yaw angle estimation during the period of disturbance is calculated in FIG. 9 (middle). The reference for the error calculation is the magnetometer-aided estimation using the original non-disturbed magnetic field. While the disturbed magnetic field does not affect the performance of the proposed magnetometer-free systems and methods, Cases A and B are affected significantly as shown in FIG. 9 (middle). The disturbance results in yaw drift in Case B and causes large erroneous spikes in Case A for the magnetometer-aided solution.

C. Lower Body MoCap Accuracy

By placing the reflective markers on the anatomical landmarks, the individual Euler angles (roll, pitch and yaw) for the body segments are not accessible from the camera-based MoCap. Therefore, it necessitates a different benchmarking scheme instead of the direct comparison of each Euler angles between the systems for each body segment as suggested in some of the literature. For the benchmarking purposes, the lower-body skeleton model in FIG. 1 was formed for the camera-based MoCap. Similar to the IMU-based MoCap, the camera-based MoCap requires a standing posture calibration to map the markers' position measurements to the skeleton model in order to find the required rotation matrices for this mapping. Then, the two reconstructed models from the camera-based and IMU-based system are benchmarked against each other in two different ways.

First, the lower-body joint angles, which are based on the rotation of the lower body segments about the horizontal axis (according to FIG. 1, X-axis for the flexion/extension angles and Y-axis for the abduction/adduction angle), are compared between the two models. These angles include the hip abduction/adduction and flexion/extension, knee flexion/extension and ankle dorsiflexion/plantar flexion. Since the orientation of the leg around the vertical axis (the estimated yaw angle by the yaw Kalman filter) will not affect these joint angles, they are the angles of interest that avoid the use of the magnetometer. However, the tracking accuracy for those typical lower body joint angles is not sufficient to evaluate the system's performance for 3-D MoCap in gaming and sport science application. For these applications, in order to perform 3-D motion reconstruction, the instantaneous 3-D orientation of the segments is of importance. Thus, a second comparison method is provided that also takes the estimations from the yaw Kalman filter into account. In this second comparison, the angle in 3-D space between the thigh segments of the IMU-based and camera-based models (the thigh error) and the one for the shank segments (the shank error) during the experimental trials is calculated.

Figure 10A:
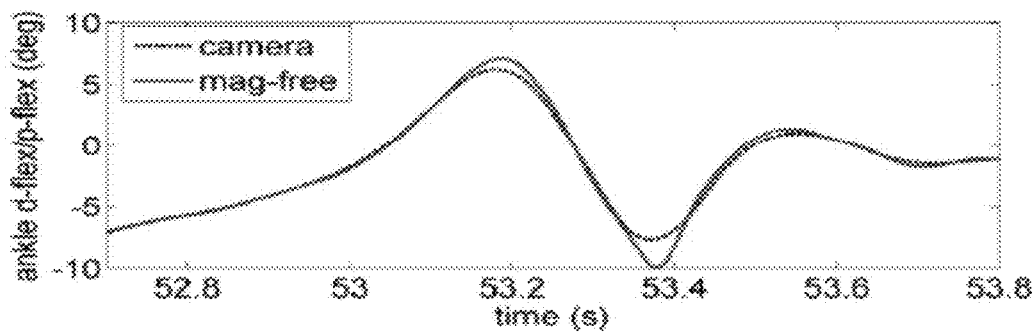
FIG. 10A is a graph showing ankle dorsiflexion/plantar flexion and during one gait cycle of a walking trial.
Figure 10B:
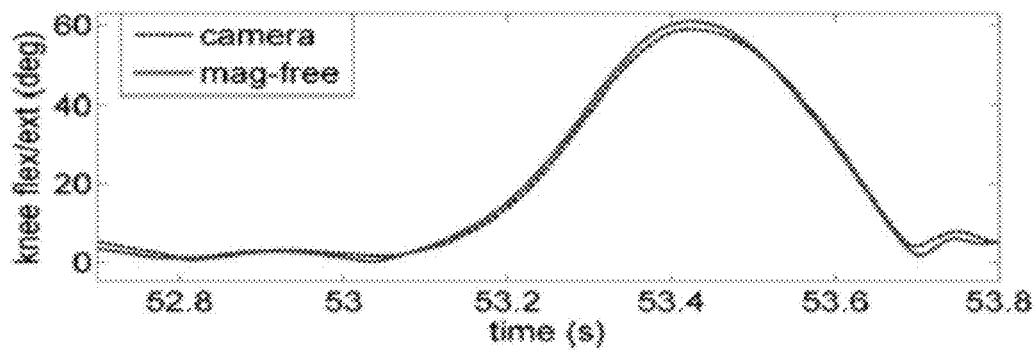
FIG. 10B is a graph showing knee flexion/extension during one gait cycle of a walking trial.
Figure 10C:
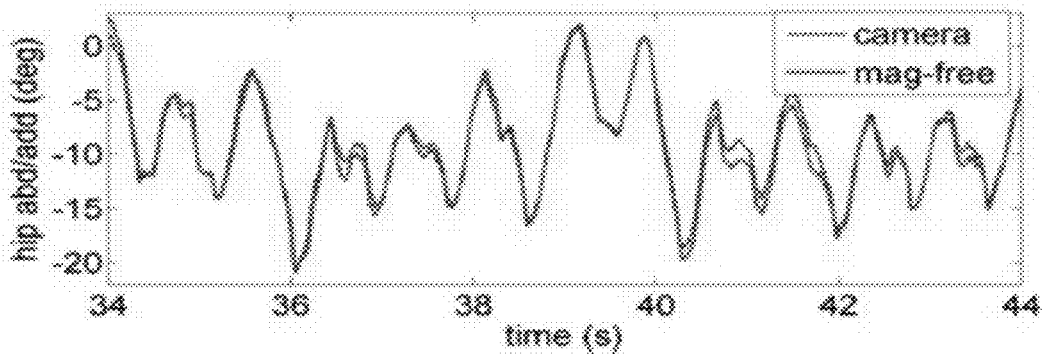
FIG. 10O is a graph showing hip abduction/adduction during 10 s of a jogging trial.
FIG. 10D is a graph showing hip flexion/extension during 10 s of a jogging trial.
Figure 10D:
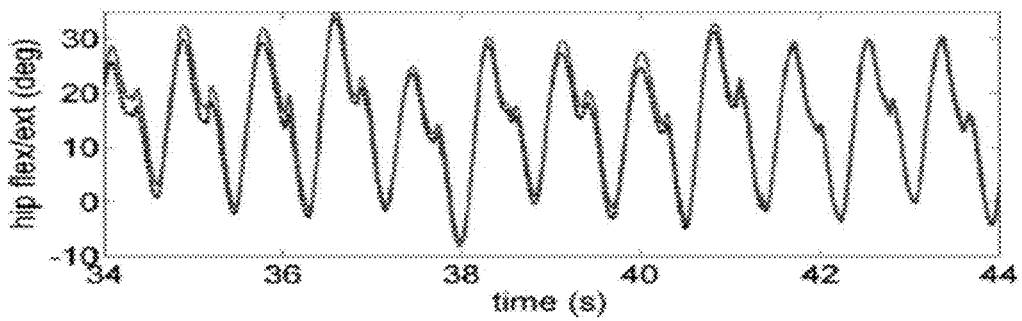

FIGS. 10A and 10B show the ankle dorsiflexion/plantar flexion and the knee flexion/extension for one gait cycle during a walking trial. FIGS. 10O and 10D show the hip abduction/adduction and flexion/extension angle during 10 s of a jogging trial. This figure shows that the proposed systems and methods (indicated by the "mag-free" solid lines) can accurately track the lower-body joint angles during slow and fast dynamic motions.

Figures 11A, 11B:
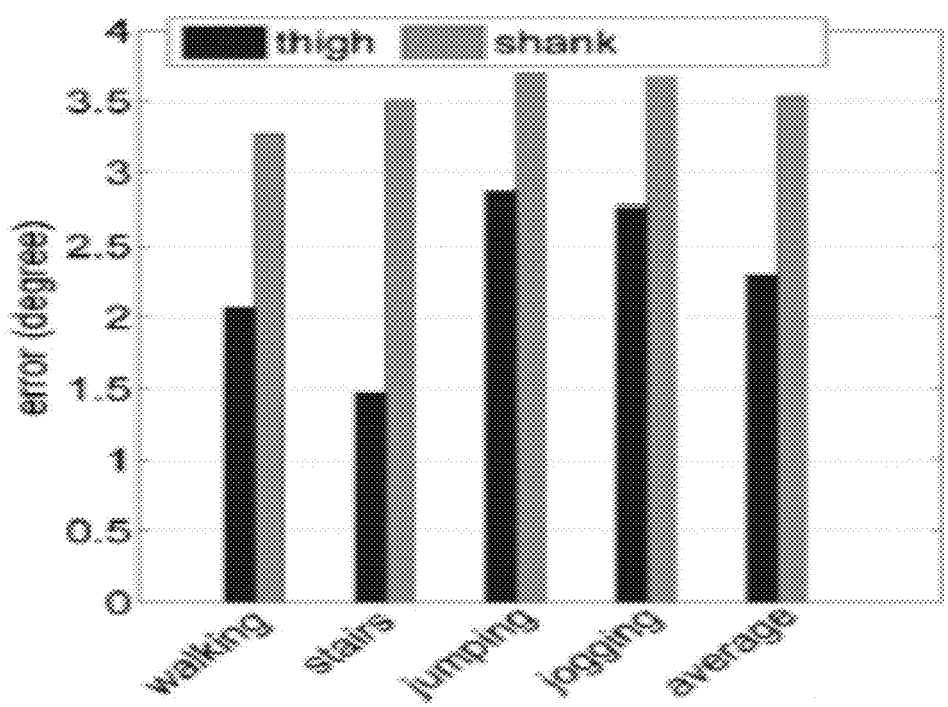
FIG. 11A is a table showing mean and standard deviation of lower body joint angle tracking error.
FIG. 11B is a graph showing estimation error for the thigh and shank 3-D orientation.

The joint angle tracking accuracies are summarized in FIG. 11A. As shown in this table the lower-body joints angle tracking varies from 1.4 to 3.5 degrees for relatively slow motions (RMSE values are averaged over the four walking and the four stairs ascending/descending trials) and from 2.1 to 4.5 degrees for relatively fast motions (RMSE values are averaged over the four jogging and the four jumping trials). This is due to the fact that in higher dynamic activities, the inertial sensors and the markers on the human leg move relative to each other as a result of muscle and skin motions, resulting in higher deviations between the inertial and optical joint angle tracking. In comparison, the reported accuracies in FIG. 11A are within the accuracy range reported in J. Zhang, A. C. Novak, B. Brouwer, and Q. Li, "Concurrent validation of Xsens MVN measurement of lower limb joint angular kinematics.," *Physiol. Meas.*, vol. 34, no. 8, pp. N63-9, August 2013 for lower-body joint angle tracking using the same inertial sensors but aided with magnetometers.

The results of the second comparison are shown in FIG. 11B. This figure shows the calculated RMSE values for the thigh and shank errors for various activities. As observed in FIG. 11A, FIG. 11B also confirms the slightly higher errors for jumping and jogging compared to walking and stairs ascending/descending. Additionally, FIG. 11B shows that the error in the thigh orientation is consistently less than the one for the shank for various activities. This is due to the fact that the proposed systems and methods assume the internal/external rotation of the knee to be negligible, which is in line with many studies in the literature. However, in reality, a healthy knee can exhibit up to about 8 degrees of internal/external rotation which affects the 3-D orientation of the shank.

Figure 12A:
FIG. 12A is a sequence of photographs of recorded motion for a typical stairs ascending/jumping-off trial.
Figure 12B:
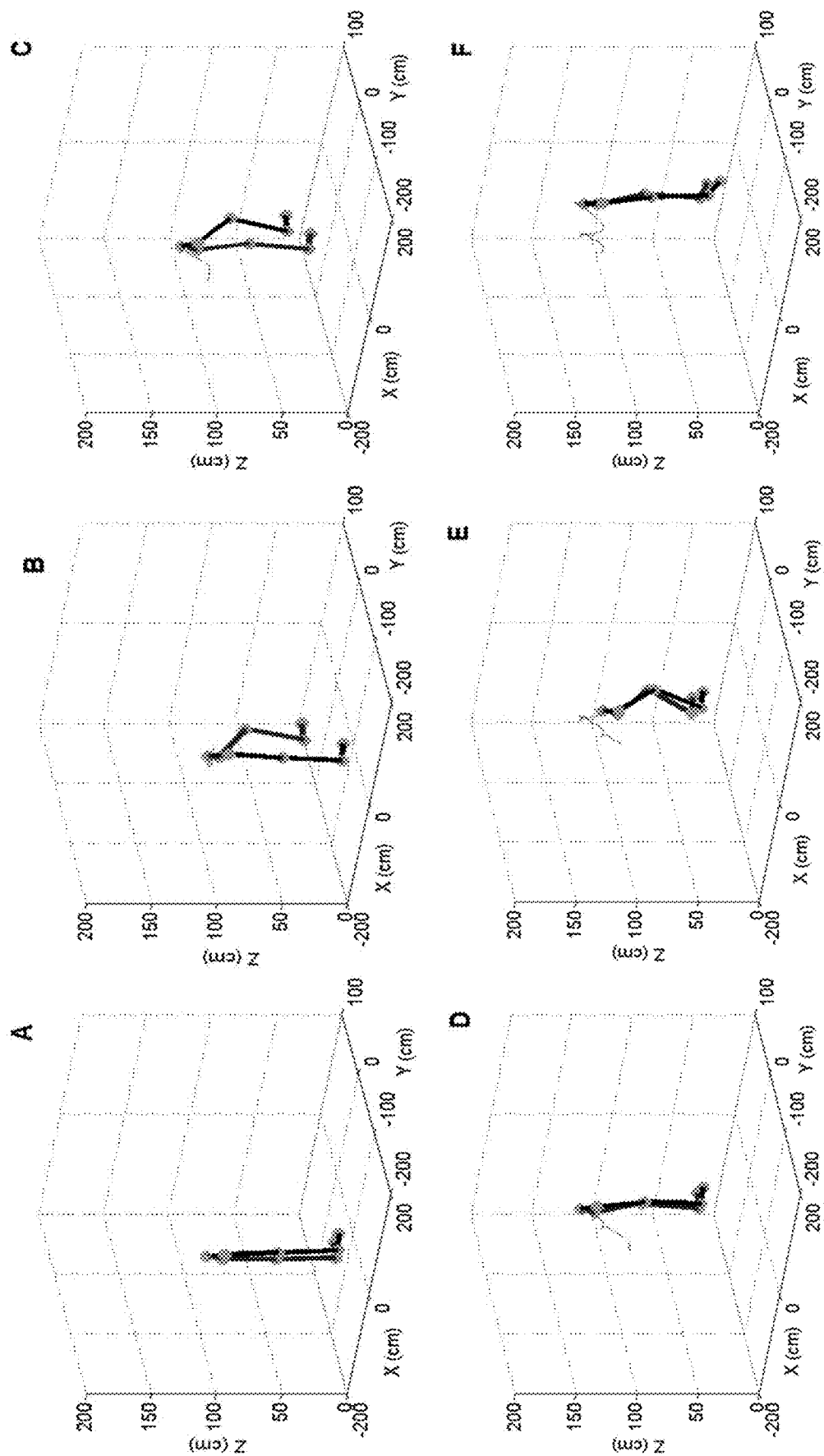
FIG. 12B shows a sequence of reconstructed motion for the trial of FIG. 12A.

FIGS. 12A and 12B compare the reconstructed motion (12B) for a stairs ascending/jumping-off trial with the motion captured by the GoPro camera (12A). These figures show that the proposed systems and methods can track the lower body kinematic well qualitatively as well. FIG. 12B shows the lower body of a human subject as body segments forming kinematic chains. Each kinematic chain has a root segment and an end segment. In the case of the lower body of a human subject, there are two kinematic chains, with the waist forming the root segment of each chain, and the left and right feet forming the end segments.

The present disclosure proposes novel methods and systems for capturing the motion of human lower-body including 3-D localization and posture tracking. The systems and methods fuse the inertial data from seven lower-body segments and the UWB localization data on the feet and waist with the biomechanical model of the lower-body to develop a magnetometer-free lower-body MoCap solution. In contrast, MoCap methods which are aided with magnetometers for drift correction and will get affected by magnetic disturbances. However, the proposed magnetometer-free methods and systems are completely robust against any type of magnetic disturbances. The performance of the proposed system has been tested experimentally using indoor subject trials including walking, jogging, jumping and stairs ascending/descending.

The experimental results show that the proposed systems and methods can provide the accuracy of better than 4.5 cm in 3-D spaces. In terms of joint angle tracking, the accuracy of the proposed systems and methods is about 3.5 and 4.5 degree for knee angle tracking in low and high dynamic motions, respectively. A comparison against the reported results in the literature reveals that the proposed method can reach similar accuracies in localization and posture tracking as the ones obtained by magnetometer-aided methods. However, based on our experimental results, the proposed systems and methods outperforms the available magnetometer-aided methods in the presence of magnetic disturbances after an initial convergence time of about 20 s.

The proposed systems and methods are targeted toward indoor MoCap applications in gaming, film making, sports, augmented reality, human-robot interactions, etc. where the magnetic disturbances from the infrastructure and electrical equipment are unavoidable. The limitation is that the tracking area has to be covered by the UWB sensor system, which is still significantly more cost effective than the typical optical MoCap systems. However, the proposed can be generalized to work with any other absolute localization system (such as a vision system or other type of localization system) that has similar accuracies to the UWB technology. In some embodiments, the systems and methods disclosed herein may be extended to include the upper-body to provide a magnetometer-free full-body MoCap solution.

APPENDIX A

Derivation of Eqs. (28) and (29):

Using Eq. (1), the rotation matrix for the left thigh, ${}_{lt}^{n}R(k)$, can be written in terms of the states of the yaw Kalman filter $z_{i,lt}$, i=1, 2, 3, and the thigh yaw angle $\alpha_{lt}$:

$$\,_{lt}^{n}R(k) = \begin{bmatrix} z_{1,lt} & z_{2,lt} & z_{3,lt} \\ s\alpha_{lt}c\beta_{lt} & s\alpha_{lt}s\gamma_{lt}s\beta_{lt} + c\alpha_{lt}c\gamma_{lt} & s\alpha_{lt}c\gamma_{lt}s\beta_{lt} - c\alpha_{lt}s\gamma_{lt} \\ -s\beta_{lt} & s\gamma_{lt}c\beta_{lt} & c\gamma_{lt}c\beta_{lt} \end{bmatrix} \quad \text{(A-1)}$$

Similar to Eq. (A-1) and assuming the yaw angle of the shank being equal to the one of the thigh, the rotation matrix for the left shank, ${}_{ls}^{n}R(k)$ can be written in terms of $\alpha_{lt}$:

$$\,_{lt}^{n}R(k) = \begin{bmatrix} c\alpha_{lt}c\beta_{ls} & c\alpha_{lt}s\beta_{ls}s\gamma_{ls} - s\alpha_{lt}c\gamma_{ls} & c\alpha_{lt}k_{4,sh}c\gamma_{ls} - c\alpha_{lt}s\gamma_{ls} \\ s\alpha_{lt}c\beta_{ls} & s\alpha_{lt}s\gamma_{ls}s\beta_{ls} + c\alpha_{lt}c\gamma_{ls} & s\alpha_{lt}c\gamma_{ls}s\beta_{ls} - c\alpha_{lt}s\gamma_{ls} \\ -s\beta_{ls} & s\gamma_{lt}c\beta_{ls} & c\gamma_{ls}c\beta_{ls} \end{bmatrix} \quad \text{(A-2)}$$

Using $z_{1,lt}=c\alpha_{lt}\,c\beta_{lt}$, $z_{2,lt}=c\alpha_{lt}\,s\beta_{lt}s\gamma_{lt}-s\alpha_{lt}\,c\gamma_{lt}$ and $z_{3,lt}=c\alpha_{lt}\,s\beta_{lt}\,c\gamma_{lt}+s\alpha_{lt}\,s\gamma_{lt}$; $s\alpha_{lt}$, and $c\alpha_{lt}$ can be written in terms of $z_{i,lt}$, i=1, 2, 3 as follows:

$$s\alpha_{lt}(k) = -c\gamma_{lt}z_{2,l} + s\gamma_{lt}z_{3,lt} \quad \text{(A-3)}$$

$$c\alpha_{lt}(k) = \frac{z_{1,lt}}{c\beta_{lt}} \quad \text{(A-4)}$$

and:

$$p_{lh\text{-}la}(k) = \quad \text{(A-5)}$$
$$p_{la}(k) - p_{lh}(k) = {}_{lt}^{n}R(k)[\,0 \;\; 0 \;\; -h_{th}\,]^{T} + {}_{ls}^{n}R(k)[\,0 \;\; 0 \;\; -h_{sh}\,]^{T}$$

Substituting Eqs. (A-3) and (A-4) into Eqs. (A-1) and (A-2) and expanding Eq. (A-5), Eqs. (28) and (29) can be found as the first and the second components of $p_{lh\text{-}la}$, respectively.

REFERENCES

The following references, each of which are incorporated by reference herein, are related to the subject matter of the present disclosure:

[1] X. Zhang and G. Fan, "Dual gait generative models for human motion estimation from a single camera," *IEEE Trans. Syst. Man, Cybern. Part B Cybern.*, vol. 40, no. 4, pp. 1034-49, August 2010.

[2] J. Gu, X. Ding, S. Wang, and Y. Wu, "Action and gait recognition from recovered 3-D human joints," *IEEE Trans. Syst. Man, Cybern. Part B Cybern*, vol. 40, no. 4, pp. 1021-1033, August 2010.

[3] P. Chen, J. Li, M. Luo, and N. Zhu, "Real-Time Human Motion Capture Driven by a Wireless Sensor Network," *Int. J. Comput. Games Technol.*, vol. 2015, Article ID 695874, 14 pages, January 2015.

[4] I. Damian, M. Obaid, F. Kistler, and E. Andre, "Augmented reality using a 3d motion capturing suit," in *Proceedings of the 4th Augmented Human International Conference AH'* 13, New York, USA, pages 233-234. March 2013.

[5] A. Shingade and A. Ghotkar, "Animation of 3D Human Model Using Markerless Motion Capture Applied To Sports," *Int. J. Comput. Graph. Animat.*, vol. 4, no. 1, pp. 27-39, January 2014.

[6] S. Zihajehzadeh, T. J. Lee, J. K. Lee, R. Hoskinson and E. J. Park, "Integration of MEMS Inertial and Pressure Sensors for Vertical Trajectory Determination," *IEEE Trans. Instrum. Meas.*, vol. 64, no. 3, pp. 804-814, March 2015.

[7] S. Zihajehzadeh, D. Loh, M. Lee, R. Hoskinson and E. J. Park, "A Cascaded Two-Step Kalman Filter for Estimation of Human Body Segment Orientation Using MEMS-IMU," *Conf. Proc. IEEE Eng. Med. Biol. Soc.*, Chicago, Ill., August 2014, pp. 6270-6273.

[8] S. Zihajehzadeh, D. Loh, T. J. Lee, R. Hoskinson, and E. J. Park, "A cascaded Kalman filter-based GPS/MEMS-IMU integration for sports applications," *Measurement*, vol. 73, pp. 200-210, September 2015.

[9] J. Favre, B. M. Jolles, R. Aissaoui, and K. Aminian, "Ambulatory measurement of 3D knee joint angle.,"*J. Biomech.*, vol. 41, no. 5, pp. 1029-35, January 2008.

[10] E. Roux, S. Bouilland, A. P. Godillon-Maquinghen, and D. Bouttens, "Evaluation of the global optimisation method within the upper limb kinematics analysis," *J. Biomech.*, vol. 35, no. 9, pp. 1279-1283, September 2002.

[11] G. Welch and E. Foxlin, "Motion tracking: no silver bullet, but a respectable arsenal," *IEEE Comput. Graphic. Applicat.*, vol. 22, no. 6, pp. 24-38, December 2002.

[12] X. L. Meng, Z. Q. Zhang, S. Y. Sun, J. K. Wu, and W. C. Wong, "Biomechanical model-based displacement estimation in micro-sensor motion capture," *Meas. Sci. Technol.*, vol. 23, no. 5, pp. 055101-1-11, May 2012.

[13] X. Meng, Z. Q. Zhang, J. K. Wu, and W. C. Wong, "Hierarchical information fusion for global displacement estimation in microsensor motion capture.," *IEEE Trans. Biomed. Eng.*, vol. 60, no. 7, pp. 2052-63, July 2013.

[14] Q. Yuan and I. M. Chen, "3-D Localization of Human Based on an Inertial Capture System," *IEEE Trans. Robot.*, vol. 29, no. 3, pp. 806-812, June 2013.

[15] C. H. Wu and Y. C. Tseng, "Deploying Sensors for Gravity Measurement in a Body-Area Inertial Sensor Network," *IEEE Sens. J.*, vol. 13, no. 5, pp. 1522-1533, May 2013.

[16] Z. Q. Zhang, L. Y. Ji, Z. P. Huang, and J.-K. Wu, "Adaptive Information Fusion for Human Upper Limb Movement Estimation," *IEEE Trans. Syst. Man, Cybern.—Part A Syst. Humans*, vol. 42, no. 5, pp. 1100-1108, September 2012.

[17] S. Pittet, V. Renaudin, B. Merminod, and M. Kasser, "UWB and MEMS Based Indoor Navigation," *J. Navig.*, vol. 61, no. 03, pp. 369-384, June 2008.

[18] J. A. Corrales, F. A. Candelas, and F. Torres, "Sensor data integration for indoor human tracking," *Rob. Auton. Syst.*, vol. 58, no. 8, pp. 931-939, August 2010.

[19] E. Foxlin, "Pedestrian Tracking with Shoe-Mounted Inertial Sensors," *IEEE Comput. Graphic. Applicat.*, vol. 25, no. 6, pp. 38-46, December 2005.

[20] Y. Zhang, J. Tan, Z. Zeng, W. Liang, and Y. Xia, "Monocular camera and IMU integration for indoor position estimation," *Conf. Proc. IEEE Eng. Med. Biol. Soc.*, Chicago, Ill., August 2014, pp. 1198-1201.

[21] Q. Yuan and I. M. Chen, "Human velocity and dynamic behavior tracking method for inertial capture system," *Sensors Actuators A Phys.*, vol. 183, pp. 123-131, August 2012.

[22] Y. Gu, A. Lo, and I. Niemegeers, "A survey of indoor positioning systems for wireless personal networks," *IEEE Commun. Surv. Tutorials*, vol. 11, no. 1, pp. 13-32, March 2009.

[23] J. Fortes, D. November, P. Komensk, and R. Zetik, "Short-Range UWB Radar: Surveillance Robot Equipment of the Future," *IEEE Int. Conf. on Syst. Man, Cybern.*, San Diego, Calif., October 2014, pp. 3767-3772.

[24] F. Zampella, A. R. Jimenez and F. Seco, "Robust indoor positioning fusing PDR and RF technologies: the RFID and UWB case," *Int. Conf. Indoor Position. Indoor Navig.* (*IPIN* 2013), Montbeliard, France, October 2013.

[25] J. D. Hol, F. Dijkstra, H. Luinge, and T. B. Schon, "Tightly Coupled UWB/IMU Pose Estimation." *Int. Conf. on Ultra-Wideband*, Vancouver, Canada, September 2009, pp. 688-692.

[26] F. Zampella, A. De Angelis, I. Skog, D. Zachariah, and A. Jimenez, "A constraint approach for UWB and PDR fusion," *Int. Conf. Indoor Position. Indoor Navig.* (*IPIN* 2012), November 2012.

[27] S. Zihajehzadeh, P. K. Yoon, B. Kang and E. J. Park, "UWB-Aided Inertial Motion Capture for Lower Body 3-D Dynamic Activity and Trajectory Tracking," *IEEE Trans. Instrum. Meas.*, doi: 10.1109/TIM.2015.2459532, August 2015.

[28] S. Zihajehzadeh, P. K. Yoon and E. J. Park, "A Magnetometer—Free Indoor Human Localization Based on Loosely Coupled IMU/UWB Fusion," *Conf. Proc. IEEE Eng. Med. Biol. Soc.*, Milan, Italy, August 2015, pp. 3141-3144.

[29] J. K. Lee, and E. J. Park "Minimum-Order Kalman Filter With Vector Selector for Accurate Estimation of Human Body Orientation," *IEEE Trans. Robot.*, vol. 25, no. 5, pp. 1196-1201, October 2009.

[30] J. K. Lee and E. J. Park, "A fast quaternion-based orientation optimizer via virtual rotation for human motion tracking.," *IEEE Trans. Biomed. Eng.*, vol. 56, no. 5, pp. 1574-82, May 2009.

[31] T. H. Riehle, S. M. Anderson, P. A. Lichter, N. A. Giudice, S. I. Sheikh, R. J. Knuesel, D. T. Kollmann, D. S. Hedin, and A. P. Hardware, "Indoor Magnetic Navigation for the Blind," in *Conf. Proc. IEEE Eng. Med. Biol. Soc.*, San Diego, Calif., USA, August 2012, pp. 1972-1975.

[32] S. A. H. Tabatabaei, A. Gluhak, and R. Tafazolli, "A fast calibration method for triaxial magnetometers," *IEEE Trans. Instrum. Meas.*, vol. 62, no. 11, pp. 2929-2937, October 2013.

[33] D. Roetenberg, H. J. Luinge, C. T. M. Baten, and P. H. Veltink, "Compensation of magnetic disturbances improves inertial and magnetic sensing of human body segment orientation.," *IEEE Trans. Neural Syst. Rehabil. Eng.*, vol. 13, no. 3, pp. 395-405, September 2005.

[34] A. M. Sabatini, "Quaternion-based extended Kalman filter for determining orientation by inertial and magnetic sensing.," *IEEE Trans. Biomed. Eng.*, vol. 53, no. 7, pp. 1346-56, July 2006.

[35] M. El-Gohari, and J. McNames, "Human Joint Angle Estimation with Inertial Sensors and Validation with A Robot Arm," *IEEE Trans. Biomed. Eng.*, February 2015.

[36] G. Cooper, I. Sheret, L. McMillian, K. Siliverdis, N. Sha, D. Hodgins, L. Kenney, and D. Howard, "Inertial sensor-based knee flexion/extension angle estimation," *J. Biomech.*, vol. 42, no. 16, pp. 2678-2685, September 2009.

[37] T. Seel, J. Raisch, and T. Schauer, "IMU-based joint angle measurement for gait analysis.," *Sensors (Basel).*, vol. 14, no. 4, pp. 6891-909, April 2014.

[38] H. J. Luinge, P. H. Veltink, and C. T. M. Baten, "Ambulatory measurement of arm orientation," *J. Biomech.*, vol. 40, no. 1, pp. 78-85, January 2007.

[39] Y. Tian, X. Meng, D. Tao, D. Liu, and C. Feng, "Upper limb motion tracking with the integration of IMU and Kinect," *Neurocomputing*, vol. 159, pp. 207-218, July 2015.

[40] J. K. Lee, E. J. Park, and S. Robinovitch, "Estimation of attitude and external acceleration using inertial sensor measurement during various dynamic conditions," *IEEE Trans. Instrum. Meas.*, vol. 61, no. 8, pp. 2262-2273, August 2012.

[41] I. Skog, H. Peter, J. Nilsson, and J. Rantakokko, "Zero-Velocity Detection—An Algorithm Evaluation," *EEE Trans. Biomed. Eng.*, vol. 57, no. 11, November 2010.

[42] Q. Li and J. Zhang, "Post-trial anatomical frame alignment procedure for inertial/magnetic sensor systems in joint angle measurement," *Physiol. Meas.*, vol. 35, no. 11, November 2014.

[43] J. Zhang, A. C. Novak, B. Brouwer, and Q. Li, "Concurrent validation of Xsens MVN measurement of lower limb joint angular kinematics.," *Physiol. Meas.*, vol. 34, no. 8, pp. N63-9, August 2013.

[44] A. Waegli, J. Skaloud, P. Tomé, and J. Bonnaz, "Assessment of the Integration Strategy between GPS and Body-Worn MEMS Sensors with Application to Sports," in *Conf. Proc. ION GNSS*, Texas, USA, September 2007.

[45] Z. Q. Zhang and J. K. Wu, "A Novel Hierarchical Information Fusion Method for Three-Dimensional Upper Limb Motion Estimation," *IEEE Trans. Instrum. Meas.*, vol. 60, no. 11, pp. 3709-3719, November 2011.

[46] R. Takeda, S. Tadano, A. Natorigawa, M. Todoh, and S. Yoshinari, "Gait posture estimation using wearable acceleration and gyro sensor," *J. Biomech.*, vol. 42, no. 15, pp. 2486-2494, November 2009.

The present disclosure may be embodied in other specific forms without departing from its spirit or essential characteristics. The described embodiments are to be considered in all respects only as illustrative and not restrictive.

The invention claimed is:

1. A system for capturing lower body motion of a subject, the system comprising:

an inertial measurement unit (IMU) mounted on each of a left foot, a right foot, a left shank, a right shank, a left thigh, a right thigh and a pelvis of the subject, each IMU unit comprising an accelerometer and a gyroscope and configured to output rate of turn signals and acceleration signals;

a localization tag mounted on each of a left mid foot location of the left foot, a right mid foot location of the right foot and a waist of the subject;

a localization sensor system configured to detect each localization tag and to output position signals for each localization tag;

non-transitory memory storing data for the subject and a hardware processor executing instructions for processing signals to determine the subject's lower body motion, the hardware processor having input devices in communication with each IMU and with the localization sensor system to receive the rate of turn, acceleration, and position signals, and to derive velocity signals for each localization tag from the position signals; and, a plurality of filters comprising:

a tilt Kalman filter configured to process the rate of turn and acceleration signals from each IMU to generate a pitch angle and a roll angle for each of the left foot, right foot, left shank, right shank, left thigh, right thigh and pelvis;

a localization Kalman filter configured to process the pitch angle and the roll angle from the tilt Kalman filter and from a rotation matrix for each of the left foot, right foot and pelvis to generate a position vector for each of the left mid foot, right mid foot and waist;

a yaw Kalman filter configured to process the pitch angle and the roll angle for each of the left shank, right shank, left thigh and right thigh from the tilt Kalman filter and the position vector for each of the left mid foot, right mid foot and waist and the rotation matrix for each of the left foot, right foot and pelvis from the localization Kalman filter to generate a yaw angle for each of the left shank, right shank, left thigh and right thigh;

the hardware processor configured to execute instructions for processing outputs from the plurality of filters to reconstruct full three-dimensional motion of the subject's lower body based on the pitch angle and the roll angle for each of the left shank, right shank, left thigh and right thigh from the tilt Kalman filter, the position vector for each of the left mid foot, right mid foot and waist and the rotation matrix for each of the left foot, right foot and pelvis from the localization Kalman filter, and the yaw angle for each of the left shank, right shank, left thigh and right thigh from the yaw Kalman filter.

2. The system of claim 1 wherein the hardware processor is configured to:

determine a corrected waist position based on the position vector for each of the left mid foot and right mid foot, and the pitch angle, the roll angle and the yaw angle for each of the left foot, right foot, left shank, right shank, left thigh, right thigh and pelvis;

reconstruct motion of the left foot, left shank and left thigh as a first kinematic chain starting from the corrected waist position; and reconstruct motion of the right foot, right shank and right thigh as a second kinematic chain starting from the corrected waist position.

3. The system of claim 2 wherein the hardware processor is configured to determine the corrected waist position by determining a first waist position based on the position vector for the left mid foot and the pitch angle, the roll angle and the yaw angle for each of the left foot, left shank, left thigh and pelvis, determining a second waist position based on the position vector for the right mid foot and the pitch angle, the roll angle and the yaw angle for each of the right foot, right shank, right thigh and pelvis, and averaging the first waist position and the second waist position to get the corrected waist position.

4. The system of claim 3 wherein each IMU comprises a tri-axial accelerometer and a tri-axial gyroscope.

5. The system of claim 4 wherein each IMU is initialized during an initialization phase prior to capturing motion, and magnetic data is only used during the initialization phase.

6. A method for capturing motion of a subject, the method comprising:

mounting a plurality of inertial measurement units (IMUs) on the subject, each IMU mounted on one of a plurality of body segments of the subject, the plurality or body segments comprising one or more kinematic chains, each kinematic chain having a root segment and an end segment, each IMU configured to generate acceleration signals and rate of turn signals for a respective body segment;

mounting a plurality of localization tags on the subject, with one localization tag mounted at a localization point on each root segment and each end segment of the plurality of body segments of the subject;

detecting the localization tags to generate position signals and velocity signals for each of the localization tags;

processing the acceleration signals and the rate of turns signals for the plurality of IMUs in a tilt Kalman filter to generate a pitch angle and a roll angle for each of the plurality of body segments;

processing the pitch angle and the roll angle from the tilt Kalman filter and from a rotation matrix for each of the root and end segments of the plurality of body segments in a localization Kalman filter to generate a position vector for each localization point;

processing the pitch angle and the roll angle for each of the plurality of body segments other than the root and end segments from the tilt Kalman filter and the position vector for each localization point and the rotation matrix for each of the root and end segments of the plurality of body segments from the localization Kalman filter in a yaw Kalman filter to generate a yaw angle for each of the plurality of body segments other than the root and end segments; and reconstructing full three-dimensional motion of the plurality of body segments based on the pitch angle and the roll angle for each of the plurality of body segments other than the root and end segments from the tilt Kalman filter, the position vector for each localization point on each end segment and the rotation matrix for each end segment and each root segment from the localization Kalman filter, and the yaw angle for each of the plurality of body segments other than the root and end segments from the yaw Kalman filter.

7. The method of claim 6 wherein reconstructing full three-dimensional motion comprises:

determining a corrected waist position based on the position vector for each of a left mid foot location of a left foot and a right mid foot location of a right foot, and the pitch angle, the roll angle and the yaw angle for each of a left foot, a right foot, a left shank, a right shank, a left thigh, a right thigh and a pelvis;

reconstructing motion of the left foot, left shank and left thigh as a first kinematic chain starting from the corrected waist position; and reconstructing motion of the right foot, right shank and right thigh as a second kinematic chain starting from the corrected waist position.

8. The method of claim 7 wherein determining the corrected waist position comprises determining a first waist position based on the position vector for the left mid foot and the pitch angle, the roll angle and the yaw angle for each of the left foot, left shank, left thigh and pelvis, determining a second waist position based on the position vector for the right mid foot and the pitch angle, the roll angle and the yaw angle for each of the right foot, right shank, right thigh and pelvis, and averaging the first waist position and the second waist position to get the corrected waist position.

9. The method of claim 8 wherein each IMU comprises a tri-axial accelerometer and a tri-axial gyroscope and processing the acceleration signals and the rate of turns signals comprising processing tri-axial acceleration signals and tri-axial rate of turn signals from each IMU.

10. The method of claim 9 comprising initializing each IMU during an initialization phase prior to capturing motion, and using magnetic data only during the initialization phase.

* * * * *